US008843598B2

(12) United States Patent
Singhal et al.

(10) Patent No.: US 8,843,598 B2
(45) Date of Patent: Sep. 23, 2014

(54) NETWORK BASED DEVICE FOR PROVIDING RFID MIDDLEWARE FUNCTIONALITY

(75) Inventors: Rajiv Singhal, Pleasanton, CA (US); Christopher Wiborg, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 318 days.

(21) Appl. No.: 11/965,693

(22) Filed: Dec. 27, 2007

(65) Prior Publication Data

US 2008/0104209 A1    May 1, 2008

Related U.S. Application Data

(63) Continuation of application No. 11/195,160, filed on Aug. 1, 2005, now Pat. No. 7,345,585.

(51) Int. Cl.
| | |
|---|---|
| H04L 29/06 | (2006.01) |
| H04L 29/08 | (2006.01) |
| H04L 12/26 | (2006.01) |
| H04M 17/00 | (2006.01) |
| H04J 1/16 | (2006.01) |
| G01K 1/02 | (2006.01) |
| H04N 1/32 | (2006.01) |
| H04B 17/00 | (2006.01) |
| G06F 17/30 | (2006.01) |
| H04N 1/00 | (2006.01) |

(52) U.S. Cl.
CPC ........... *H04L 29/06* (2013.01); *H04L 29/08981* (2013.01); *H04L 29/08072* (2013.01); *H04L 2209/80* (2013.01); *H04L 12/26* (2013.01); *H04M 17/305* (2013.01); *H04J 1/16* (2013.01); *G01K 1/022* (2013.01); *H04N 1/32138* (2013.01); *G06F 2212/178* (2013.01); *H04B 17/00* (2013.01); *G06F 17/30725* (2013.01); *H04N 1/00342* (2013.01)
USPC ........................................ 709/220

(58) Field of Classification Search
CPC ....... H04L 29/06; H04J 1/16; H04N 1/00342; H04B 17/00; G06F 17/30725
USPC ................................................... 709/220
See application file for complete search history.

(56) References Cited

U.S. PATENT DOCUMENTS

| 4,688,026 A | 8/1987 | Scribner et al. |
| 5,339,073 A | 8/1994 | Dodd et al. |

(Continued)

FOREIGN PATENT DOCUMENTS

| EP | 01217804 | 6/2002 |
| WO | WO98-26530 | 6/1998 |

(Continued)

OTHER PUBLICATIONS

Crocker et al., "MIME Object Security Services", 1995.*
Gildea et al., "Convergence Technologies for Sensor Systems in the Next Generation Networks (NGN)", 2007.*
ODonnell et al., "On Achieving Software Diversity for Improved Network Security using Distributed Coloring Algorithms", 2004.*

(Continued)

*Primary Examiner* — Ondrej Vostal

(57) ABSTRACT

Some embodiments of the present invention provide middleware functionality integrated into a module of a network device, such as a router or switch, that is configured to provide application-oriented network ("AON") services. Some preferred implementations of the invention provide policy-based application services for RFID data, such as conditional routing, security (encryption, identification, authentication and authorization), data translation and/or transformation, data compression, data caching, etc. Some preferred implementations can interpret an application request and route to an appropriate network address of an RFID reader. Preferably, ALE (application-level event) aggregation and filtering can also be performed on behalf of the application. Some methods of the invention allow event data to be sent to applications (including but not limited to business applications) as request-response messages. Other methods of the invention allow event data to be sent to applications in the form of asynchronous notifications.

26 Claims, 12 Drawing Sheets

(56) References Cited

U.S. PATENT DOCUMENTS

| | | |
|---|---|---|
| 5,574,722 A | 11/1996 | Slykhouse et al. |
| 5,646,616 A | 7/1997 | Komatsu |
| 5,790,542 A | 8/1998 | Kim et al. |
| 5,796,743 A | 8/1998 | Bunting et al. |
| 5,819,042 A | 10/1998 | Hansen |
| 5,832,503 A | 11/1998 | Malik et al. |
| 5,850,187 A | 12/1998 | Carrender et al. |
| 5,887,176 A | 3/1999 | Griffith et al. |
| 5,949,335 A * | 9/1999 | Maynard ..................... 340/572.1 |
| 6,012,090 A | 1/2000 | Chung et al. |
| 6,021,135 A | 2/2000 | Ishihara et al. |
| 6,070,187 A | 5/2000 | Subramaniam et al. |
| 6,073,178 A | 6/2000 | Wong |
| 6,111,517 A | 8/2000 | Atick et al. |
| 6,115,079 A | 9/2000 | McRae |
| 6,115,378 A | 9/2000 | Hendel et al. |
| 6,125,391 A | 9/2000 | Meltzer et al. |
| 6,145,079 A | 11/2000 | Mitty et al. |
| 6,226,675 B1 | 5/2001 | Meltzer et al. |
| 6,272,113 B1 | 8/2001 | McIntyre |
| 6,300,903 B1 | 10/2001 | Richards et al. |
| 6,321,264 B1 | 11/2001 | Fletcher et al. |
| 6,337,856 B1 | 1/2002 | Schanhals et al. |
| 6,341,130 B1 | 1/2002 | Lakshman et al. |
| 6,356,951 B1 | 3/2002 | Gentry |
| 6,363,477 B1 | 3/2002 | Fletcher et al. |
| 6,381,465 B1 | 4/2002 | Chern et al. |
| 6,510,434 B1 | 1/2003 | Anderson et al. |
| 6,510,464 B1 | 1/2003 | Grantges et al. |
| 6,539,281 B2 | 3/2003 | Wan et al. |
| 6,553,489 B1 | 4/2003 | Osler et al. |
| 6,567,408 B1 * | 5/2003 | Li et al. ..................... 370/395.31 |
| 6,587,431 B1 | 7/2003 | Almulhem et al. |
| 6,587,874 B1 | 7/2003 | Golla et al. |
| 6,597,918 B1 | 7/2003 | Kim |
| 6,611,526 B1 | 8/2003 | Chinnaswamy et al. |
| 6,665,713 B1 | 12/2003 | Hada et al. |
| 6,678,827 B1 | 1/2004 | Rothermel et al. |
| 6,683,881 B1 | 1/2004 | Mijares et al. |
| 6,714,985 B1 * | 3/2004 | Malagrino et al. ............ 709/236 |
| 6,718,326 B2 | 4/2004 | Uga et al. |
| 6,721,798 B1 * | 4/2004 | Kubista ........................ 709/236 |
| 6,745,041 B2 | 6/2004 | Allison et al. |
| 6,772,204 B1 | 8/2004 | Hansen et al. |
| 6,772,211 B2 | 8/2004 | Lu et al. |
| 6,772,223 B1 | 8/2004 | Corl, Jr. et al. |
| 6,785,732 B1 | 8/2004 | Bates et al. |
| 6,792,002 B2 | 9/2004 | Tezuka et al. |
| 6,810,040 B1 | 10/2004 | Lee et al. |
| 6,816,455 B2 | 11/2004 | Goldberg et al. |
| 6,862,270 B1 | 3/2005 | Ho |
| 6,868,426 B1 | 3/2005 | Mankoff |
| 6,931,574 B1 * | 8/2005 | Coupal et al. .................... 714/39 |
| 6,944,678 B2 | 9/2005 | Lu et al. |
| 6,950,822 B1 | 9/2005 | Idicula et al. |
| 6,963,282 B1 | 11/2005 | Yeates et al. |
| 6,965,599 B1 | 11/2005 | Sakurai et al. |
| 6,996,842 B2 | 2/2006 | Strahm et al. |
| 7,002,907 B1 | 2/2006 | Chen et al. |
| 7,032,031 B2 | 4/2006 | Jungck et al. |
| 7,054,924 B1 | 5/2006 | Harvey et al. |
| 7,057,511 B2 | 6/2006 | Shanks et al. |
| 7,058,973 B1 | 6/2006 | Sultan |
| 7,064,660 B2 | 6/2006 | Perkins et al. |
| 7,075,412 B1 | 7/2006 | Reynolds et al. |
| 7,081,819 B2 | 7/2006 | Martinez de Velasco Cortina et al. |
| 7,089,586 B2 | 8/2006 | Kilgore |
| 7,103,886 B2 | 9/2006 | Haller et al. |
| 7,111,076 B2 | 9/2006 | Abjanic et al. |
| 7,111,163 B1 | 9/2006 | Haney |
| 7,114,008 B2 | 9/2006 | Jungck et al. |
| 7,117,364 B1 | 10/2006 | Hepper et al. |
| 7,120,139 B1 | 10/2006 | Kung et al. |
| 7,126,907 B2 | 10/2006 | Carpini et al. |
| 7,129,837 B2 | 10/2006 | Shannon et al. |
| 7,134,075 B2 | 11/2006 | Hind et al. |
| 7,149,222 B2 | 12/2006 | Wiryaman et al. |
| 7,150,017 B1 | 12/2006 | Vogl et al. |
| 7,185,365 B2 | 2/2007 | Tang et al. |
| 7,205,897 B2 | 4/2007 | Lin |
| 7,215,637 B1 | 5/2007 | Ferguson et al. |
| 7,215,641 B1 | 5/2007 | Bechtolsheim et al. |
| 7,239,634 B1 | 7/2007 | Chakravorty |
| 7,245,620 B2 | 7/2007 | Shankar |
| 7,249,170 B2 | 7/2007 | Tindal et al. |
| 7,296,268 B2 | 11/2007 | Darling et al. |
| 7,299,361 B1 | 11/2007 | Kim et al. |
| 7,308,715 B2 * | 12/2007 | Gupta et al. ....................... 726/23 |
| 7,321,556 B1 | 1/2008 | Parekh et al. |
| 7,330,908 B2 | 2/2008 | Jungck |
| 7,345,585 B2 | 3/2008 | Singhal et al. |
| 7,362,763 B2 | 4/2008 | Wybenga et al. |
| 7,363,353 B2 | 4/2008 | Ganesan et al. |
| 7,376,755 B2 | 5/2008 | Pandya |
| 7,388,488 B2 * | 6/2008 | Lupoli et al. ................ 340/572.1 |
| 7,411,915 B1 | 8/2008 | Spain et al. |
| 7,415,512 B1 | 8/2008 | Moon |
| 7,421,695 B2 | 9/2008 | Murray et al. |
| 7,437,451 B2 | 10/2008 | Tang et al. |
| 7,545,941 B2 * | 6/2009 | Sovio et al. .................... 380/270 |
| 7,590,715 B1 * | 9/2009 | Raanan ........................ 709/223 |
| 7,685,606 B2 * | 3/2010 | Chang ........................... 719/318 |
| 7,844,687 B1 * | 11/2010 | Gelvin et al. ................. 709/220 |
| 7,853,983 B2 * | 12/2010 | Abrutyn et al. ..................... 726/2 |
| 7,949,355 B2 * | 5/2011 | Brown et al. .................. 455/466 |
| 7,962,655 B2 * | 6/2011 | Birger et al. .................. 709/250 |
| 8,060,623 B2 | 11/2011 | Vogel et al. |
| 8,113,418 B2 | 2/2012 | Howarth et al. |
| 8,140,658 B1 * | 3/2012 | Gelvin et al. ................. 709/224 |
| 2001/0012292 A1 | 8/2001 | Merrill et al. |
| 2001/0016800 A1 * | 8/2001 | Koh et al. ...................... 702/188 |
| 2001/0021950 A1 * | 9/2001 | Hawley et al. ................. 709/225 |
| 2001/0028308 A1 | 10/2001 | De La Huerga |
| 2001/0046862 A1 * | 11/2001 | Coppinger et al. ............ 455/435 |
| 2001/0047422 A1 | 11/2001 | McTernan et al. |
| 2002/0015485 A1 | 2/2002 | Bhusri |
| 2002/0016739 A1 | 2/2002 | Ogasawara |
| 2002/0069279 A1 | 6/2002 | Romero et al. |
| 2002/0075805 A1 | 6/2002 | Gupta et al. |
| 2002/0075843 A1 * | 6/2002 | Lau ............................... 370/349 |
| 2002/0091636 A1 * | 7/2002 | Carroll Bullard ............... 705/40 |
| 2002/0105911 A1 | 8/2002 | Pruthi et al. |
| 2002/0107951 A1 | 8/2002 | Teague et al. |
| 2002/0114274 A1 | 8/2002 | Sturges et al. |
| 2002/0126672 A1 | 9/2002 | Chow et al. |
| 2002/0136403 A1 | 9/2002 | Henson et al. |
| 2002/0143981 A1 | 10/2002 | DeLima et al. |
| 2002/0150102 A1 * | 10/2002 | Janko et al. ..................... 370/392 |
| 2002/0161907 A1 | 10/2002 | Moon |
| 2002/0163933 A1 | 11/2002 | Benveniste |
| 2002/0163934 A1 * | 11/2002 | Moore et al. ................... 370/465 |
| 2002/0165957 A1 | 11/2002 | Devoe et al. |
| 2002/0194342 A1 | 12/2002 | Lu et al. |
| 2002/0194345 A1 | 12/2002 | Lu et al. |
| 2002/0194350 A1 | 12/2002 | Lu et al. |
| 2003/0005117 A1 | 1/2003 | Kang et al. |
| 2003/0009571 A1 | 1/2003 | Bavadekar |
| 2003/0018726 A1 | 1/2003 | Low et al. |
| 2003/0026268 A1 | 2/2003 | Navas |
| 2003/0028599 A1 | 2/2003 | Kolsky |
| 2003/0028616 A1 | 2/2003 | Aoki et al. |
| 2003/0036897 A1 | 2/2003 | Flores et al. |
| 2003/0046429 A1 | 3/2003 | Sonksen |
| 2003/0048195 A1 * | 3/2003 | Trossen ..................... 340/825.49 |
| 2003/0055818 A1 | 3/2003 | Faybihenko et al. |
| 2003/0069975 A1 | 4/2003 | Abjanic et al. |
| 2003/0078031 A1 | 4/2003 | Masuda |
| 2003/0093530 A1 | 5/2003 | Syed |
| 2003/0095569 A1 | 5/2003 | Wengrovitz et al. |
| 2003/0104848 A1 * | 6/2003 | Brideglall ...................... 455/574 |
| 2003/0105903 A1 | 6/2003 | Garnett et al. |
| 2003/0112802 A1 | 6/2003 | Ono et al. |
| 2003/0112809 A1 | 6/2003 | Bharali et al. |

(56) References Cited

U.S. PATENT DOCUMENTS

| | | |
|---|---|---|
| 2003/0115448 A1 | 6/2003 | Bouchard |
| 2003/0120384 A1 | 6/2003 | Haitin et al. |
| 2003/0135563 A1* | 7/2003 | Bodin et al. ................ 709/206 |
| 2003/0140140 A1 | 7/2003 | Lahtinen |
| 2003/0163539 A1 | 8/2003 | Piccinelli |
| 2003/0163603 A1 | 8/2003 | Fry et al. |
| 2003/0174714 A1 | 9/2003 | Manik et al. |
| 2003/0177183 A1 | 9/2003 | Cabrera et al. |
| 2003/0188192 A1* | 10/2003 | Tang et al. ................... 713/201 |
| 2003/0189935 A1 | 10/2003 | Warden et al. |
| 2003/0202535 A1 | 10/2003 | Foster et al. |
| 2003/0202536 A1* | 10/2003 | Foster et al. ................. 370/469 |
| 2003/0204626 A1 | 10/2003 | Wheeler |
| 2003/0204719 A1 | 10/2003 | Ben-Itzhak |
| 2003/0217171 A1 | 11/2003 | Von Stuermer et al. |
| 2003/0217176 A1 | 11/2003 | Beunings |
| 2003/0220835 A1* | 11/2003 | Barnes, Jr. ..................... 705/14 |
| 2003/0236883 A1 | 12/2003 | Takeshima et al. |
| 2004/0001444 A1 | 1/2004 | Sadot et al. |
| 2004/0006613 A1 | 1/2004 | Lemieus et al. |
| 2004/0021569 A1 | 2/2004 | Lepkofker et al. |
| 2004/0022250 A1 | 2/2004 | Chen et al. |
| 2004/0022255 A1 | 2/2004 | Chen et al. |
| 2004/0024658 A1* | 2/2004 | Carbone et al. ................ 705/28 |
| 2004/0024868 A1 | 2/2004 | Drummond, II |
| 2004/0032881 A1 | 2/2004 | Arai |
| 2004/0039940 A1 | 2/2004 | Cox et al. |
| 2004/0054886 A1 | 3/2004 | Dickinson et al. |
| 2004/0061646 A1 | 4/2004 | Andrews et al. |
| 2004/0069852 A1 | 4/2004 | Seppinen et al. |
| 2004/0088460 A1 | 5/2004 | Poisner |
| 2004/0088585 A1 | 5/2004 | Kaler et al. |
| 2004/0100383 A1 | 5/2004 | Chen et al. |
| 2004/0108795 A1 | 6/2004 | Meek et al. |
| 2004/0121789 A1 | 6/2004 | Lindsey |
| 2004/0128389 A1 | 7/2004 | Kopchik |
| 2004/0133775 A1 | 7/2004 | Callas et al. |
| 2004/0136371 A1 | 7/2004 | Muralidhar et al. |
| 2004/0143629 A1* | 7/2004 | Bodin et al. ................ 709/205 |
| 2004/0148177 A1* | 7/2004 | Weng et al. ................... 704/278 |
| 2004/0162871 A1 | 8/2004 | Pabla et al. |
| 2004/0167986 A1 | 8/2004 | Gilfix et al. |
| 2004/0170182 A1 | 9/2004 | Higashida et al. |
| 2004/0174261 A1* | 9/2004 | Volpi et al. ................. 340/572.1 |
| 2004/0205336 A1 | 10/2004 | Kessler et al. |
| 2004/0205770 A1 | 10/2004 | Zhang et al. |
| 2004/0221319 A1 | 11/2004 | Zenoni |
| 2004/0235454 A1* | 11/2004 | Rowitch et al. ................ 455/411 |
| 2004/0257202 A1 | 12/2004 | Coughlin et al. |
| 2004/0264441 A1* | 12/2004 | Jalkanen et al. .............. 370/352 |
| 2004/0267920 A1 | 12/2004 | Hydrie et al. |
| 2004/0267933 A1 | 12/2004 | Przybylski et al. |
| 2004/0268357 A1 | 12/2004 | Joy et al. |
| 2005/0005031 A1 | 1/2005 | Gordy et al. |
| 2005/0015619 A1 | 1/2005 | Lee |
| 2005/0021626 A1 | 1/2005 | Prajapat et al. |
| 2005/0021836 A1 | 1/2005 | Reed et al. |
| 2005/0025091 A1 | 2/2005 | Patel et al. |
| 2005/0027778 A1 | 2/2005 | Dimitrelis et al. |
| 2005/0041670 A1 | 2/2005 | Lin et al. |
| 2005/0050362 A1 | 3/2005 | Peles |
| 2005/0054290 A1* | 3/2005 | Logan et al. ................. 455/41.2 |
| 2005/0054346 A1 | 3/2005 | Windham et al. |
| 2005/0063377 A1 | 3/2005 | Bryant et al. |
| 2005/0071508 A1 | 3/2005 | Brown et al. |
| 2005/0076332 A1 | 4/2005 | Jawaharlal et al. |
| 2005/0080914 A1 | 4/2005 | Lerner et al. |
| 2005/0093679 A1 | 5/2005 | Zai et al. |
| 2005/0094611 A1 | 5/2005 | Cheong et al. |
| 2005/0099268 A1* | 5/2005 | Juels et al. .................... 340/10.4 |
| 2005/0099270 A1 | 5/2005 | Diorio et al. |
| 2005/0102393 A1 | 5/2005 | Murray et al. |
| 2005/0114394 A1 | 5/2005 | Kaipa et al. |
| 2005/0117576 A1 | 6/2005 | McDysan et al. |
| 2005/0144437 A1* | 6/2005 | Ransom et al. ................ 713/151 |
| 2005/0154653 A1* | 7/2005 | Jongebloed ..................... 705/28 |
| 2005/0165828 A1 | 7/2005 | Lango et al. |
| 2005/0169171 A1 | 8/2005 | Cheng et al. |
| 2005/0188103 A1 | 8/2005 | Chen |
| 2005/0199716 A1 | 9/2005 | Shafer et al. |
| 2005/0209947 A1* | 9/2005 | Shafer ............................ 705/36 |
| 2005/0213591 A1 | 9/2005 | Nakazawa et al. |
| 2005/0216727 A1 | 9/2005 | Chattopadhyay et al. |
| 2005/0228893 A1 | 10/2005 | Devarapalli et al. |
| 2005/0229243 A1 | 10/2005 | Svendsen et al. |
| 2005/0252957 A1 | 11/2005 | Howarth et al. |
| 2005/0252970 A1 | 11/2005 | Howarth et al. |
| 2005/0252971 A1 | 11/2005 | Howarth et al. |
| 2005/0253717 A1 | 11/2005 | Howarth et al. |
| 2005/0253718 A1 | 11/2005 | Droms et al. |
| 2005/0253722 A1 | 11/2005 | Droms et al. |
| 2005/0264420 A1 | 12/2005 | Vogel et al. |
| 2005/0286461 A1 | 12/2005 | Zhang et al. |
| 2006/0005035 A1 | 1/2006 | Coughlin |
| 2006/0010086 A1 | 1/2006 | Klein |
| 2006/0021010 A1 | 1/2006 | Atkins et al. |
| 2006/0031374 A1 | 2/2006 | Lu et al. |
| 2006/0033606 A1 | 2/2006 | Howarth et al. |
| 2006/0044111 A1 | 3/2006 | Kollar et al. |
| 2006/0047464 A1* | 3/2006 | Kumar et al. ................. 702/122 |
| 2006/0053234 A1 | 3/2006 | Kumar et al. ................. 710/11 |
| 2006/0068711 A1 | 3/2006 | Chiu et al. .................... 455/67.7 |
| 2006/0080467 A1* | 4/2006 | Gould et al. .................. 709/250 |
| 2006/0091999 A1 | 5/2006 | Howarth |
| 2006/0098662 A1* | 5/2006 | Gupta et al. .................. 370/401 |
| 2006/0106941 A1 | 5/2006 | Singhal et al. |
| 2006/0123226 A1* | 6/2006 | Kumar et al. ................. 713/154 |
| 2006/0123425 A1* | 6/2006 | Ramarao et al. .............. 719/313 |
| 2006/0123467 A1* | 6/2006 | Kumar et al. ..................... 726/3 |
| 2006/0123477 A1 | 6/2006 | Raghavan et al. |
| 2006/0123479 A1 | 6/2006 | Kumar et al. |
| 2006/0129650 A1 | 6/2006 | Ho et al. |
| 2006/0129689 A1 | 6/2006 | Ho et al. |
| 2006/0132304 A1* | 6/2006 | Cabell ...................... 340/539.23 |
| 2006/0143318 A1 | 6/2006 | Prajapat et al. |
| 2006/0146879 A1* | 7/2006 | Anthias et al. ................ 370/471 |
| 2006/0155862 A1 | 7/2006 | Kathi et al. |
| 2006/0155969 A1 | 7/2006 | Yoda et al. |
| 2006/0167975 A1 | 7/2006 | Chan et al. |
| 2006/0168334 A1 | 7/2006 | Potti et al. |
| 2006/0208885 A1* | 9/2006 | Lin ............................. 340/572.1 |
| 2006/0218374 A1* | 9/2006 | Ebert ............................... 712/5 |
| 2006/0220838 A1* | 10/2006 | Wakim et al. ............ 340/539.12 |
| 2006/0236062 A1 | 10/2006 | Boss et al. |
| 2006/0248225 A1 | 11/2006 | Batz et al. |
| 2006/0249010 A1* | 11/2006 | John et al. ....................... 89/1.11 |
| 2006/0253590 A1 | 11/2006 | Nagy et al. |
| 2006/0256768 A1 | 11/2006 | Chan |
| 2006/0262721 A1* | 11/2006 | Radunovic et al. ........... 370/229 |
| 2006/0266832 A1 | 11/2006 | Howarth et al. |
| 2006/0279412 A1* | 12/2006 | Holland et al. ............. 340/10.51 |
| 2006/0280181 A1* | 12/2006 | Brailas et al. ................. 370/392 |
| 2007/0013518 A1 | 1/2007 | Howarth |
| 2007/0027966 A1 | 2/2007 | Singhal et al. |
| 2007/0055864 A1 | 3/2007 | Tock et al. |
| 2007/0058634 A1* | 3/2007 | Gupta et al. ................. 370/392 |
| 2007/0080784 A1 | 4/2007 | Kim et al. |
| 2007/0112574 A1* | 5/2007 | Greene ............................ 705/1 |
| 2007/0258048 A1* | 11/2007 | Pitchers ..................... 353/26 R |
| 2007/0283001 A1* | 12/2007 | Spiess et al. ................. 709/224 |
| 2008/0025230 A1* | 1/2008 | Patel et al. ................... 370/252 |
| 2008/0052757 A1* | 2/2008 | Gulati et al. ..................... 726/1 |
| 2008/0136599 A1* | 6/2008 | Sugano et al. ................ 340/10.1 |
| 2008/0186136 A1* | 8/2008 | Raphaeli et al. ............. 340/10.1 |
| 2008/0295155 A1* | 11/2008 | Czyszczewski et al. ........... 726/4 |
| 2008/0301298 A1* | 12/2008 | Bernardi et al. .............. 709/226 |
| 2009/0006840 A1* | 1/2009 | Birger et al. .................. 713/151 |
| 2009/0215385 A1* | 8/2009 | Waters et al. ..................... 455/1 |
| 2010/0094945 A1 | 4/2010 | Chan et al. |

(56) References Cited

U.S. PATENT DOCUMENTS

2011/0004781 A1 1/2011 Howarth
2012/0259674 A1* 10/2012 Cantwell et al. ............ 705/7.29

FOREIGN PATENT DOCUMENTS

| WO | WO99-07116 | 2/1999 |
|----|----|----|
| WO | WO02-27507 | 4/2002 |
| WO | WO03-021465 | 3/2003 |
| WO | WO 03/021465 A1 | 3/2003 |
| WO | WO2004-012424 | 2/2004 |
| WO | WO2006-073804 | 12/2005 |
| WO | WO2006-055406 | 5/2006 |
| WO | WO2006-057852 | 6/2006 |
| WO | WO2006-062814 | 6/2006 |
| WO | WO2006-063002 | 6/2006 |
| WO | WO2006-073740 | 7/2006 |
| WO | WO2007-011591 | 7/2006 |
| WO | WO2007-002334 | 1/2007 |

OTHER PUBLICATIONS

Grand, "MIME Overview", 1993.*
Salem et al, "An Interoperability Framework for Sensor and UMTS Networks", Mar. 2007.*
Gildea et al., "Embedded Systems in a Mobile Distributed IP Network", ITB Journal, Dec. 2003, pp. 92-99.*
Sommer, "BRO: An Open Source Network Intrusion Detection System", 2003.*
Radunovic, EP 05009063, "Receiving Data in a Sensor Network", Apr. 2005.*
Jena et al., "Modeling and Evaluation of Internet Applications", 2002.*
De et al., "An Ubiquitous Architectural Framework and Protocol for Object Tracking using RFID tags", 2004.*
Lee et al., "System Architecture for Context-Aware Home Application", 2004.*
Zimmermann, "OSI Reference Model—The ISO Model of Architecture for Open Systems Interconnection", 1980.*
Conte et al., "A Black Box Framework for an Application Protocol Stack", 2000.*
Lee et al., "Principle and Technique for Encapsulation of User Control and Data Information in Separate Frames", 1996.*
Finkenzeller, "RFID Handbook Second Edition", 2003.*
Finkenzeller, "RFID Handbook: Fundamentals and Applications in Contactless Smart Cards and Identification", Chapter 3, 2003.*
International Searching Authority, Notification of Tranmittal of the International Search Report and the Written Opinion on the International Searching Authority, or the Declaration, International application No. PCT/US05/46149, dated Jul. 20, 2007, 9 pages.
Claims, International application No. PCT/US05/46149, 10 pages.
Supplemental Notice of Allowance and Notice of Allowability, mailed Oct. 22, 2007 from U.S. Appl. No. 11/195,160.
Office Action mailed May 12, 2008 from U.S. Appl. No. 11/104,140.
U.S. Office Action mailed Jun. 26, 2007 from U.S. Appl. No. 11/195,160.
Notice of Allowance and Notice of Allowability, mailed Sep. 19, 2007 from U.S. Appl. No. 11/195,160.
Notice of Allowance and Notice of Allowability, mailed Sep. 10, 2007 from U.S. Appl. No. 10/866,506.
Notice of Allowance and Notice of Allowability, mailed Sep. 28, 2007 from U.S. Appl. No. 10/866,507.
Notice of Allowance and Notice of Allowability, mailed Sep. 10, 2007 from U.S. Appl. No. 10/866,285.
Notice of Allowance and Notice of Allowability, mailed Oct. 11, 2007 from U.S. Appl. No. 11/010,089.
International Searching Authority, "Notification of Transmittal of the International Search Report and the Written Opinion of the International Searching Authority, or the Declaration," PCT/US05/43599, dated Feb. 28, 2007, 8 pages.
Current Claims, PCT/US05/43599, 8 pages.
International Searching Authority, "Notification of Transmittal of the International Search Report and the Written Opinion of the International Searching Authority, or the Declaration," PCT/US05/41254, dated Mar. 28, 2007, 7 pages.
Current Claims, PCT/US05/41254, 12 pages.
International Searching Authority, "Notification of Transmittal of the International Search Report and the Written Opinion of the International Searching Authority, or the Declaration," PCT/US05/44171, dated Nov. 30, 2006, 7 pages.
Current Claims, PCT/US05/44171, 12 pages.
International Searching Authority, "Notification of Transmittal of the International Search Report and the Written Opinion of the International Searching Authority, or the Declaration," PCT/US2006/024375, dated Oct. 17, 2006, 10 pages.
Current Claims, PCT/US2006/024375, 5 pages.
OA U.S. Appl. No. 11/007,421, filed Dec. 7, 2004 Mailed on Oct. 16, 2006.
OA U.S. Appl. No. 10/991,792, filed on Nov. 17, 2004 Mailed on Oct. 20, 2006.
International Searching Authority, "Notification of Transmittal of the International Search Report and the Written Opinion of the International Searching Authority, or the Declaration," PCT/US05/45625, dated Oct. 20, 2006, 7 pages.
Current Claims PCT/US05/45625, 8 pages.
International Searching Authority, "Notification of Transmittal of the International Search Report and the Written Opinion of the International Searching Authority, or the Declaration," PCT/US05/40861, dated Nov. 17, 2006, 7 pages.
Current Claims PCT/US05/40861, 5 pages.
Decasper, Dan et al., "Router Plugins: A Software Architecture for Next Generation Routers," IEEE ACM Transactions on Networking, vol. 9, No. 1, Feb. 2000, XP011038838, 14 pages.
US Office Action mailed Mar. 22, 2007 from (related) U.S. Appl. No. 10/866,506.
US Office Action mailed Apr. 4, 2007 from (related) U.S. Appl. No. 10/866,285.
US Office Action mailed Jun. 18, 2007 from (related) U.S. Appl. No. 11/010,089.
Droms, R., Dynamic Host Configuration Protocol, RFC 2131, Mar. 1997, 43 pages.
Alexander, S., et al., DHCP Options and BOOTP Vendor Extensions, RFC 2132, Mar. 1997, 32 pages.
Stump, G., et al., The User Class Option for DHCP, RFC 3004, Nov. 2000, 6 pages.
T'Joens, Y., DHCP Reconfigure Extension, RFC 3203, Dec. 2001, 6 pages.
Patrick, M., DHCP Relay Agent Information Option, RFC 3046, Jan. 2001, 14 pages.
Lonvick, C., The BSD Syslog Protocol, RFC 3164, Aug. 2001, 28 pages.
Johnston, M., DHCP Preboot Execution Environment (PXE) Options draft-ietf-dhc-pxe-options-01.txt, Internet-Draft, Jan. 21, 2005, 7 pages.
Johnson, R., *TFTP Server Address DHCP Option draft-raj-dhc-tftp-addr-option-00.txt*, Internet-Draft, Feb. 6, 2005, 7 pages.
Littlefield, J., *Vendor-Identifying Vendor Options for Dynamic Host Configuration Protocol version 4 (DPHCPv4)*, RFC 3925, Oct. 2004, 9 pages.
Schulzrinne, H., Dynamic Host Configuration Protocol (DHCPv4 and DHCPv6) Option for Civic Addresses Configuration Information, draft-ietf-geopriv-dhcp-civil-05, Internet-Draft, Feb. 19, 2004.
Polk, J., et al., Dynamic Host Configuration Protocol Option for Coordinate-based Location Configuration Information, RFC 3825, Jul. 2004, 15 pages.
AeroScout Visibility System: Bridging the Gap Between Wi-Fi, Active RFID and Telemetry, AeroScout Enterprise Visibility Solutions, http://www.aeroscout.com/content.asp?page=SystemOverview, printed Apr. 16, 2005, 3 pages.
WhereNet, Products, http://wherenet.com/products_main.html, printed Apr. 16, 2005, 2 pages.
Simple Network Management Protocol, Internetworking Technologies Handbook, Chapter-56, printed Jul. 14, 2005, 12 pages.

(56) References Cited

OTHER PUBLICATIONS

International Search Report dated Oct. 13, 2005, from (related) International Application No. PCT/US05/16484, 6 pp. including Notification of Transmittal.
Written Opinion of the International Searching Authority dated Oct. 13, 2005, from (related) International Application No. PCT/US05/16484, 5 pp.
Harrington, D., et al, An Architecture for DescribingSimple Network Management Protocol (SNMP) Management Frameworks, RFC 3411, Dec. 2002, 64 pages.
Presuhn, R., Editor, Version 2 of the Protocol Operations for the Simple Network Management Protocol (SNMP), RFC 3416, Dec. 2002, 31 pages.
Global Location No. (GLN) Implementation Guide, Uniform Code Council, Inc., May 2002, 13 pages.
Mockapetris, P., "*Domain Names—Concepts and Facilities*", RFC 1034, Nov. 1987, 43 pages.
Mockapetris, P., "*Domain Names—Implementation and Specification*", RFC 1035, 55 pages.
International Search Report dated Jul. 13, 2006, from (related) International Application No. PCT/US05/16319, 5 pp. including Notification of Transmittal.
Written Opinion of the International Searching Authority dated Jul. 13, 2006, from (related) International Application No. PCT/US05/16319, 5 pp.
US Office Action mailed Aug. 9, 2006 from (related) U.S. Appl. No. 10/866,507.
US Office Action mailed Oct. 6, 2006 from (related) U.S. Appl. No. 10/866,506.
US Office Action mailed Oct. 6, 2006 from (related) U.S. Appl. No. 10/866,285.
US Office Action mailed Nov. 13, 2006 from (related)U.S. Appl. No. 11/073,245, 12 pp.
US Office Action mailed Jan. 18, 2007 from (related) U.S. Appl. No. 10/866,507, 4 pp.
International Search Report dated Feb. 17, 2006, from related International Application No. PCT/US05/15322, 5 pp. including Notification of Transmittal.
Written Opinion of the International Searching Authority dated Feb. 17, 2006, from related International Application No. PCT/US05/15322, 3 pp.
"*EPCgl, Frequently Asked Questions*", Retrieved from the internet: http://www.epcglobalinc.com/about/faqs.html, [Retrieved Mar. 24, 20009], 9 pages.
"*EPCTM Tag Data Standards Version 1.1 Rev.1.24*", EPCglobal, Standard Specification, Apr. 1, 2004, 78 pages.
"*The Global Language of Business*", Retrieved from the internet: http://www.ean-int.org/locations.html, [Retrieved Mar. 24, 2005], 5 pages.
"*Cisco Application-Oriented Networking: A Network-Based Intelligent Message Routing System*", http://www.cisco.com/en/US/products/ps6438/products_data_sheet0900aecd802c1f9c.html Data Sheet, Cisco Systems, Inc., Jul. 13, 2005, pp. 1-7.
"*Cisco Catalyst 6500 Series Application-Oriented Networking Module*", http://www.cisco.com/en/US/products/ps6438/products_data_sheet0900aecd802c1fe.9.html Data Sheet, Cisco Systems, Inc. Jul. 13, 2005, pp. 1-3.
"*Cisco Application-Oriented Networking—A Network Embedded Intelligent Message Routing System*", http://www.cisco.com/en/US/products/ps6438/prod_bulletin0900aecd802c201b.html Product Bulletin No. 2886, Cisco Systems, Inc. Jul. 13, 2005, pp. 1-3.
"*Cisco Catalyst 6500 Series Application-Oriented Networking Module: Large Photo*", Photo, Retrieved from the internet: http://www.cisco.com/en/US/products/ps6448/prod_view_selector.html [Retrieved Jul. 13, 2005], Cisco Systems, Inc. 1 page.
"*The EPCglobal Architecture Framework*" EPCglobal Final Version of Jul. 1, 2005, pp. 1-53.
Marc Girardot and Neel Sundaresan. "*Millau: an encoding format for efficient representation and exchange of XML over the web*"[Retrieved Jan. 31, 2005]. Retrieved from the internet: http://www9.org/w9cdrom/154/154.html 25 pages.
Fujitsu Limited, et al., "*Web Services Reliability (WS-Reliability) Ver1.0*", Jan. 8, 2003. pp. 1-45.
Ruslan Bilorusets et al., "*Web Services Reliable Messaging Protocol (WS-ReliableMessaging)*", Mar. 2004, pp. 1-40.
Burns, Michael, et al., "Implementing Address Assurance in the Intel IXP Router", Western Network Processors Conference, Oct. 2002, 17 pages.
Chiu, Kenneth et al., "Investigating the Limits of SOAP Performance for Scientific Computing," Nov. 7, 2002, IEEE Computer Society, 9 pages.
Mohl, Dirk S., "IEEE 1588: Running Real-Time on Ethernet; Getting the Right web server—Time to consider Ethernet for I/O," retrieved from Internet at <http://ethernet.industrial-networking.com/articles/i17 real-time.asp>; downloaded on Mar. 10, 2004 (6 pgs).
Montague, Jim (2003) "Ethernet Hits Real-Time . . . Really," Control Engineering, Dec. 1, 2003, copyright 2004 Reed Business Information, a division of Reed Elsevier Inc.; retrieved from Internet at <http://www.manufacturing.net/ctl/ iindex.asp?dlayout=articlePrint&- articleID=CA339683>; downloaded on Mar. 1, 2004 (3 pgs).
PCT International Search Report and Written Opinion dated Oct. 17, 2006, from PCT/US2006/024375 [Palermo].
PCT International Preliminary Examination Report dated Dec. 24, 2007, from PCT/US2006/024375 [Palermo].
PCT International Search Report and Written Opinion dated Mar. 6, 2008, from PCT/US2006/026970.
PCT International Preliminary Examination Report dated Mar. 17, 2009, from PCT/US2006/026970.
PCT International Search Report and Written Opinion dated Nov. 17, 2006, from PCT/US2005/040861 [Palermo].
PCT International Preliminary Examination Report dated May 22, 2007, from PCT/US2005/040861 [Palermo].
PCT International Search Report and Written Opinion dated Mar. 28, 2007, from PCT/US2005/041254 [Palermo].
PCT International Preliminary Examination Report dated May 30, 2007, from PCT/US2005/041254 [Palermo].
PCT International Search Report and Written Opinion dated Feb. 28, 2007, from PCT/US2005/043599 [Palermo].
PCT International Preliminary Examination Report dated Jun. 13, 2007, from PCT/US2005/043599 [Palermo].
PCT International Search Report and Written Opinion dated Nov. 30, 2006, from PCT/US2005/044171 [Palermo].
PCT International Preliminary Examination Report Jun. 13, 2007, from PCT/US2005/044171 [Palermo].
PCT International Search Report and Written Opinion dated Oct. 20, 2006, from PCT/US2005/045625 [Palermo].
PCT International Search Report and Written Opinion dated Jul. 20, 2007, from PCT/US2005/046149 [Palermo].
Chinese Office Action (first) dated Jun. 27, 2008 issued in CN200580031604.01, 15 pgs [Palermo].
European Search Report dated Feb. 6, 2009 issued in EP05820894, 8 pgs [Palermo].
European Office Action dated May 28, 2009 issued in EP05820894 [Palermo].
US Office Notice of Allowance dated May 11, 2010, from U.S. Appl. No. 11/182,312.
US Non-Final Office Action dated Jun. 10, 2009, from U.S. Appl. No. 11/182,312.
US Non-Final Office Action dated Nov. 26, 2008, from U.S. Appl. No. 11/182,312.
US Examiner's Amendment dated Nov. 7, 2007, from U.S. Appl. No. 11/195,160.
US Notice of Allowance and Examiner Amendment dated Mar. 27, 2008, from U.S. Appl. No. 10/896,410.
US Non-Final Office Action dated Oct. 10, 2007, from U.S. Appl. No. 10/896,410.
U.S. Notice of Allowance dated Apr. 13, 2012 issued in U.S. Appl. No. 12/874,773.

\* cited by examiner

ND BASED DEVICE FOR
PROVIDING RFID MIDDLEWARE
FUNCTIONALITY

NETWORK BASED DEVICE FOR PROVIDING RFID MIDDLEWARE FUNCTIONALITY

CROSS-REFERENCES TO RELATED APPLICATIONS

This application is a continuation of U.S. patent application Ser. No. 11/195,160, entitled, "Network Based Device for Providing RFID Middleware Functionality" and filed on Aug. 1, 2005 now U.S. Pat. No. 7,345,585, which is hereby incorporated by reference for all purposes. This application is related to U.S. patent application Ser. No. 11/005,978, entitled "Performing Message Payload Processing Functions in a Network Element on Behalf of an Application" and filed on Dec. 6, 2004, in U.S. patent application Ser. No. 11/089,794, entitled "Method and Apparatus Providing High-Speed Processing of Structured Application Messages in a Network Device" and filed on Mar. 24, 2005 and in U.S. patent application Ser. No. 11/090,920, entitled "Method and Apparatus for Generating a Network Topology Representation Based on Inspection of Application Messages at a Network Device" and filed on Mar. 24, 2005 (collectively, the "AON Applications"), which are hereby incorporated by reference for all purposes.

BACKGROUND OF THE INVENTION

1. Field of the Invention

The present invention relates intermediate-level devices in networks involving multiple data reads over time, including but not limited to sensor networks and RFID networks. More particularly, the invention relates to middleware servers in RFID networks.

2. Description of the Related Art

"Smart labels," generally implemented by RFID tags, have been developed in an effort to address the shortcomings of bar codes and add greater functionality. RFID tags have been used to keep track of items such as airline baggage, items of clothing in a retail environment, cows and highway tolls. As shown in FIG. 1, an RFID tag 100 includes microprocessor 105 and antenna 110. In this example, RFID tag 100 is powered by a magnetic field 145 generated by an RFID reader 125. The tag's antenna 110 picks up the magnetic signal 145. RFID tag 100 modulates the signal 145 according to information coded in the tag and transmits the modulated signal 155 to the RFID reader 125.

Most RFID tags use one of the Electronic Product Code ("EPC" or "ePC") formats for encoding information. EPC codes may be formed in various lengths (common formats are 64, 96 and 96+ bits) and have various types of defined fields, which allow for identification of, e.g., individual products as well as associated information. These formats are defined in various documents in the public domain. One such document is EPC Tag Data Standards Version 1.1 Rev1.24 (EPCglobal® 2004), which is hereby incorporated by reference for all purposes.

One exemplary RFID tag format is shown in FIG. 1. Here, EPC 120 includes header 130, EPC Manager field 140, Object class field 150 and serial number field 160. EPC Manager field 140 contains manufacturer information. Object class field 150 includes a product's stock-keeping unit ("SKU") number. Serial number field 160 is a 40-bit field that can uniquely identify the specific instance of an individual product i.e., not just a make or model, but also down to a specific "serial number" of a make and model.

In theory, RFID tags and associated RFID devices (such as RFID readers and printers) could form part of a network for tracking a product (or a group of products) and its history. However, various difficulties have prevented this theory from being realized. One problem that has required considerable time and energy from RF engineers is the development of lower-cost RFID tags with acceptable performance levels. RFID devices have only recently been deployed with network interfaces.

In part because of the significant efforts that have been expended in solving the foregoing problems, prior art systems and methods for networking RFID devices are rather primitive. Many uncertainties remain regarding the functionality and implementation of RFID networks. Although EPCglobal has emerged as a de facto standards body, data standards are still evolving and form factors for many solutions are unclear.

However, some general outlines of a solution appear to be taking shape. It is envisioned that a single facility (e.g., a warehouse, factory, retail outlet, etc.) may have a large number of RFID readers. Such RFID readers may be installed on or near shipping/receiving dock doors, forklifts, shelves, etc. Each RFID reader may transmit a large number of "reads," many of which will be redundant. Due to the nature of the data gathering and sharing process, a hierarchy of middleware, edge servers/event processing engines and information services are likely to be deployed for all large RFID networks. "The EPCglobal Architecture Framework" (EPCglobal Final Version of 1 Jul. 2005) is hereby incorporated by reference for all purposes.

Accordingly, it is generally agreed that it would be desirable for most RFID networks to use "middleware" to perform functions such as data collection, filtering, aggregation and reporting of tag reads from physical RFID readers to higher-level applications. It would appear to be generally desirable that filtering and processing of information (e.g., of RFID reads) should occur as close to the network edge as possible, for bandwidth optimization, manageability, security, etc. However, many RFID devices and related network devices are deployed in a hostile industrial environment (such as a warehouse or factory) by relatively unskilled "IT" personnel. RFID devices and related network devices may not perform well in such rugged environments. Moreover, existing RFID middleware servers generally provide low levels of data security (if any).

It would be desirable to address at least some of these shortcomings of the prior art.

SUMMARY OF THE INVENTION

Some embodiments of the present invention provide middleware functionality integrated into a module of a network device, such as a router or switch, that is configured to provide application-oriented network ("AON") services. Some such implementations include two interface types. The first type is a downstream interface with multiple Readers in a warehouse, a store, etc. The second type is an upstream interface with business applications, a Warehouse Management Server ("WMS") and/or an EPC information services ("EPCIS") server. Some preferred implementations of the invention provide policy-based application services for RFID data, such as conditional routing, security (encryption, identification, authentication and authorization), data translation and/or transformation, data compression, data caching, etc.

Some preferred embodiments of the invention can abstract out vendor-specific reader implementations and can provide reader service virtualization (e.g., virtualization of a plurality of RFID readers at or near a particular location). Some preferred implementations can interpret an application request and route to an appropriate network address of an RFID reader. Preferably, ALE (application-level event) aggregation and filtering can also be performed on behalf of the application. Some methods of the invention allow event data to be sent to applications (including but not limited to business applications) as request-response messages. Other methods of the invention allow event data to be sent to applications in the form of asynchronous notifications. Preferred implementations route and deliver event information to application subscribers in the appropriate format.

Some implementations of the invention provide methods for controlling a network. One such method includes these steps: receiving a message relating to an RFID device network or a sensor network; determining an application layer protocol that was used to transmit the message; determining a message termination technique that is associated with the application layer protocol; determining the message contents, based at least in part on the message termination technique; and performing at least one action according to the message contents.

The method may include the step of determining a message classification that is associated with criteria satisfied by the message. At least one action may be performed according to the message classification. For example, the action may involve applying a rule to initiate a predetermined sequence of operations. The predetermined sequence of operations may be performed at a predetermined time interval.

The action may involve obtaining information from the RFID network. For example, the action may involve making an RFID read request to at least one RFID reader. The information may pertain to an indicated manufacturer, an indicated location, an indicated product type and/or an indicated time period. The method may include the steps of identifying and authenticating a sender of the message.

The methods of the present invention may be implemented, at least in part, by hardware and/or software. For example, some embodiments of the invention provide computer programs embodied in machine-readable media. The computer programs include instructions for controlling one or more devices to perform the methods described herein.

For example, some embodiments of the invention provide a network device, comprising: a first plurality of network interfaces configured for communication with a plurality of RFID readers; an application layer event ("ALE") adapter for processing reads from the RFID readers; a second network interface configured for communication with networked devices executing RFID-related applications; and an AON module. The AON module may be implemented, for example in a line card. The AON module may be configured to perform the following steps: receive a first ALE request from one of the networked devices; preprocess the first ALE request; issue a second ALE request to the ALE adapter; and process an ALE response from the ALE adapter.

The ALE adapter may be further configured to make read requests to one or more selected RFID readers of the plurality of RFID readers and to create the ALE response according to at least one RFID read.

The preprocessing step may involve identifying and authenticating a sender of the first ALE request. The step of processing the ALE response may include generating a notification to one or more of the networked devices when the ALE response comprises one of a set of predetermined ALE responses.

The AON module may be further configured to perform the following steps: determining a first application layer protocol that was used to transmit the first ALE request; determining a message termination technique that is associated with the first application layer protocol; and determining message contents of the first ALE request, based at least in part on the message termination technique. The AON module may be further configured to form the second ALE request according to a second application layer protocol different from the first application layer protocol. The first ALE request may be classified based on a uniform resource identifier of the first ALE request.

DETAILED DESCRIPTION OF THE INVENTION

Figure 1:
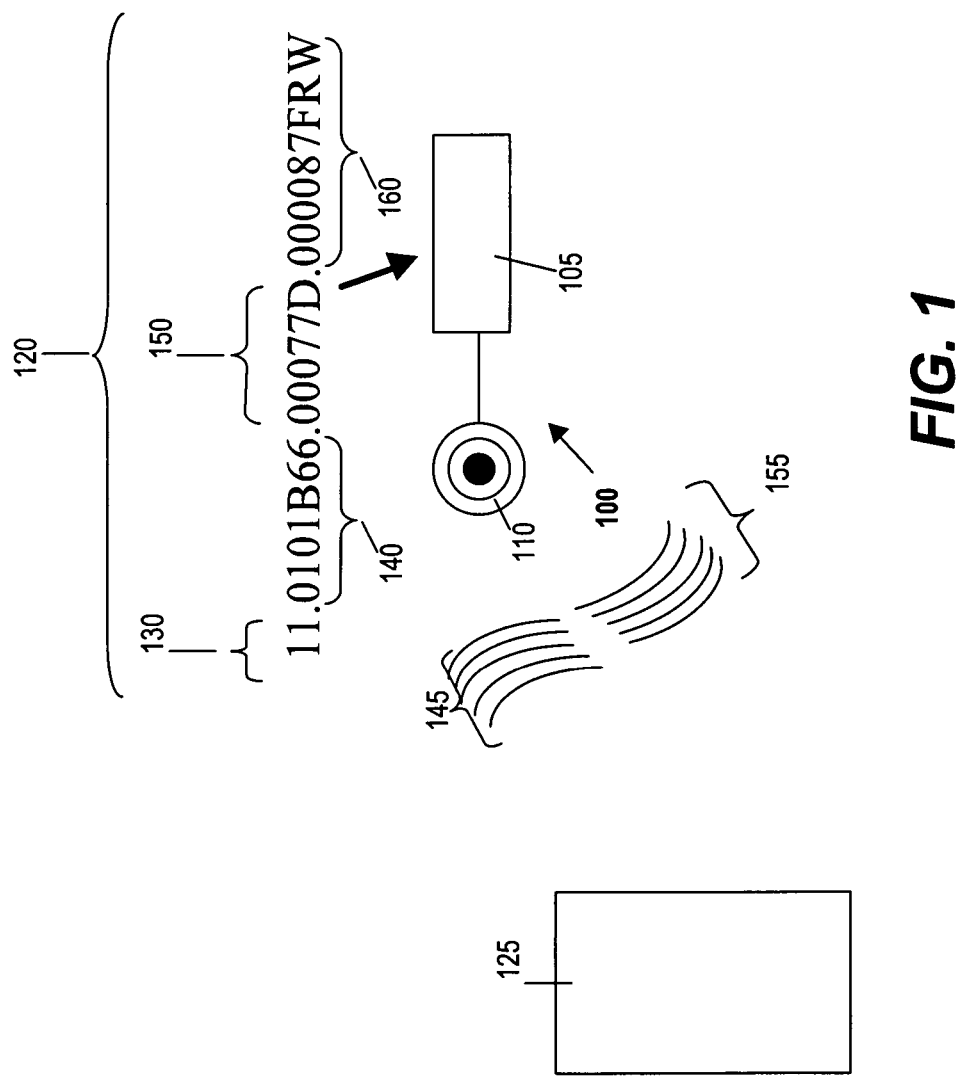
FIG. 1 is a diagram illustrating an RFID tag.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

A number of other applications filed on behalf of the present assignee, including U.S. patent application Ser. No. 10/866,506, entitled "Methods and Devices for Uniquely Provisioning RFID Devices" and filed on Jun. 9, 2004, to U.S. patent application Ser. No. 10/866,507, entitled "Methods and Devices for Locating and Uniquely Provisioning RFID Devices" and filed on Jun. 9, 2004, to U.S. patent application Ser. No. 10/866,285, entitled "Methods and Devices for Assigning RFID Device Personality" and filed on Jun. 9, 2004, to U.S. patent application Ser. No. 11/010,089, entitled "Methods and Devices for Providing Scalable RFID Networks" and filed on Dec. 9, 2004, to U.S. patent application Ser. No. 11/119,169, filed on Apr. 29, 2005, entitled "Locating and Provisioning Devices in a Network" and to U.S. patent application Ser. No. 11/129,709, filed on May 12, 2005, entitled "Locating, Provisioning and Identifying Devices in a Network" (collectively, the "RFID Applications"), describe subject matter relevant to this application. Accordingly, all of the RFID Applications are hereby incorporated by reference for all purposes.

While the present invention involves methods and devices that may be employed in RFID networks, many aspects of the present invention can be applied to other types of networks. For example, the present invention may also be used in manufacturing networks, sensor device networks, etc. Similarly, although much of the discussion herein applies to network devices that are implemented as described in one or more of the AON Applications, the present invention is not device-specific.

However, many preferred implementations of the invention are based on AON methods and devices, some of which are described in detail in the AON Applications that have been incorporated by reference herein. Because this technology is fundamental to many such implementations of the invention, a brief overview of AON methods and devices is set forth in the following paragraphs. Please note that the AON Applications use the phrase Application-Oriented Network Systems or the corresponding acronym "AONS" instead of the acronym "AON"; accordingly, these terms and acronyms will be used synonymously herein.

AON is a technology foundation for building a class of products that embed intelligence into the network to better meet the needs of application deployment. AON complements existing networking technologies by providing a greater degree of awareness of what information is flowing within the network and helping customers to integrate disparate applications by routing information to the appropriate destination, in the format expected by that destination; enforce policies for information access and exchange; optimize the flow of application traffic, both in terms of network bandwidth and processing overheads; provide increased manageability of information flow, including monitoring and metering of information flow for both business and infrastructure purposes; and provide enhanced business continuity by transparently backing up or re-routing critical business data.

AON provides this enhanced support by understanding more about the content and context of information flow. As such, AON works primarily at the message rather than at the packet level. In some implementations, AON processing of information terminates a TCP connection to inspect the full message, including the "payload" as well as all headers. AON also understands and assists with popular application-level protocols such as HTTP, FTP, SMTP and MOM protocols.

AON differs from middleware products running on general-purpose computing systems in that AON's behavior is more akin to a network appliance, in its simplicity, manageability, total cost of ownership and performance. Furthermore, AON integrates with network-layer support to provide a more holistic approach to information flow and management, mapping required features at the application layer into low-level networking features implemented by routers, switches, firewalls and other networking systems.

In one embodiment, an underlying "AON foundation platform of subsystem services" (AOS) provides a range of general-purpose services including support for security, compression, caching, reliability, policy management and other services. On top of this platform, AON then offers a range of discreet functional components that can be wired together to provide the overall processing of incoming data traffic. These "Bladelets™" are targeted at effecting individual services in the context of the specific policy or action demanded by the application or the information technology (IT) manager. A series of access method adapters ensure support for a range of ingress and egress formats. Finally, a set of user-oriented tools enable managers to appropriately view, configure and set policies for the AON solution. These four categories of functions combine to provide a range of end-customer capabilities including enhanced security, infrastructure optimization, business continuity, application integration and operational visibility.

The enhanced visibility and enhanced responsiveness enabled by AON solutions provides a number of intelligent, application-oriented network services. These intelligent services can be summarized in four primary categories:

Enhanced security and reliability: enabling reliable message delivery and providing message-level security in addition to existing network-level security.

Infrastructure optimization: making more efficient use of network resources by taking advantage of caching and compression at the message level as well as by integrating application and network quality-of-service (QoS).

Business and infrastructure activity monitoring and management: by reading information contained in the application layer message, AON can log, audit, and manage application-level business events, and combine these with network, server, and storage infrastructure events in a common, policy-driven management environment.

Content-based routing and transformation: message-based routing and transformation of protocol, content, data, and message formats (e.g., XML transformation). Some individual features belonging to each of these primary categories are described elsewhere herein and are described in greater detail in the AON Applications.

Figure 2A:
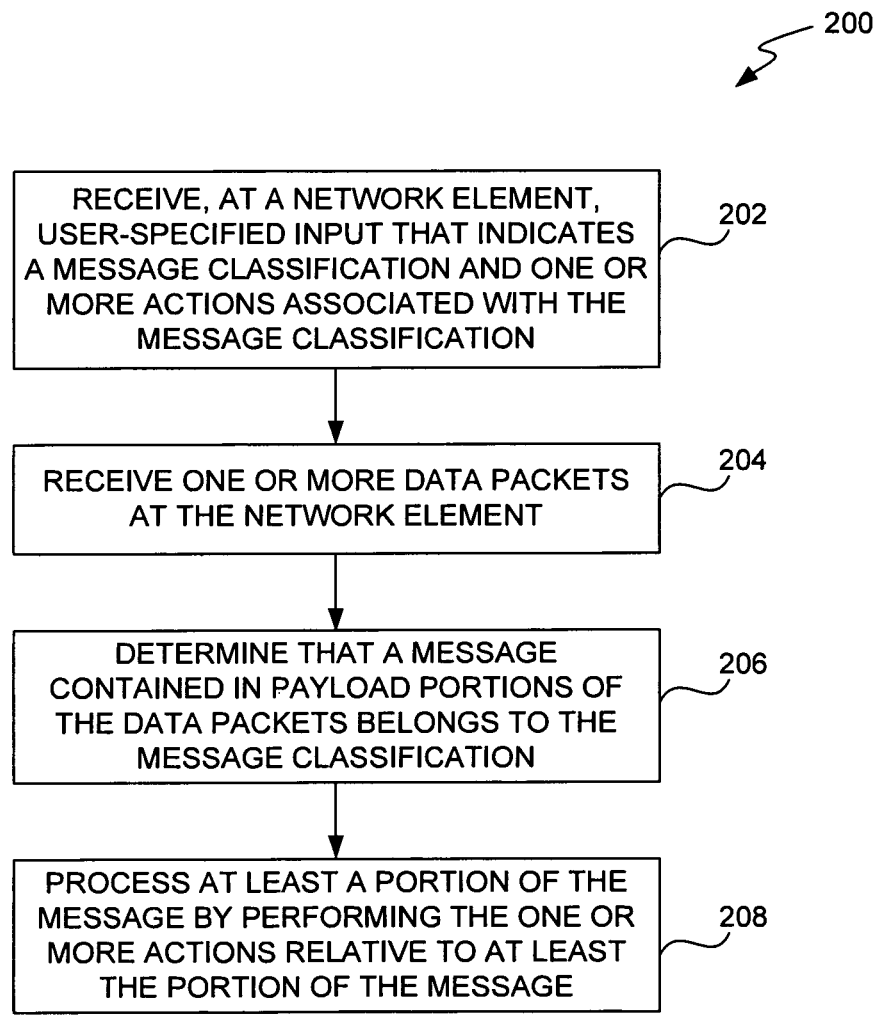
FIG. 2A is a flow chart that illustrates one example of a method that can be used to implement the present invention.

Flow chart 200 of FIG. 2A illustrates an overview of one embodiment of a method of performing message payload processing functions at a network element on behalf of a client application. Such a method may be performed, for example, by one or more blades of a middleware server that is in communication with a plurality of RFID readers and one or more networked devices that are running applications, e.g., one or more application servers, host devices, etc. According to some implementations of the invention, the "network element" may be a middleware server, one or more blades of a middleware server, etc. However, the method outlined by flow chart 200 and other methods described herein have broad applicability outside of the RFID context. For example, the methods may be performed by a variety of network devices that are in communication with devices (including but not limited to host devices) running client applications and other devices running server applications, as described with reference to FIG. 1 of U.S. patent application Ser. No. 11/005,978, the parent AON Application. The methods described herein are also particularly useful for devices that are in communication with a sensor network and with devices running applications relating to the sensor networks and/or that could be alerted, informed, take action, etc., according to input from the sensor network.

In block 202, a network element receives user-specified input. The user-specified input indicates a message classification and one or more actions that are associated with the message classification. For example, a middleware server may receive such user-specified input from a network administrator, from a host device or from an application.

The message classification defines a category or class of messages. In one example, all purchase orders belong to the same message classification. In an RFID-related example, a class of messages could pertain to a particular product type, manufacturer ID, etc., that could be determined from RFID reads. In another RFID-related example, a class of messages could pertain to RFID reads from a particular location. Other such examples will be described below. Messages that satisfy user-specified criteria or rules associated with the message classification belong to the message classification, while messages that do not satisfy these criteria or rules do not belong to the message classification.

In block 204, the network element receives one or more data units, such as data packets. As used herein the terms "packet," "data packet" and the like will include not only such data units as TCP/IP packets but will also include data units from an RFID reader (also referred to herein as "raw reads" and the like). For example, a network element may intercept one or more data packets that are destined for another device in the network. For another example, a network element may receive one or more data packets that are directed to that network element.

The network element is preferably capable of determining application layer message boundaries. In one embodiment, a network element may perform operations on an application layer message contained in a stream, or portions thereof, even if the network element has not yet received all of the data packets that contain all of the portions of the application layer message.

In block 206, based on the data packets, it is determined that an application layer message collectively contained in payload portions of the data packets belongs to the particular message classification. For example, a network element may assemble at least some of the data packets. The network element may inspect the contents of the payload portions of the assembled data packets to determine at least a portion of an application layer message that a client application is trying to send. The message may be, for example, formatted according to XML and transmitted using HTTP. As such, the message may contain HTTP and XML headers. Based on the message content and/or information in the data packet headers, the network element may determine that the message belongs to the particular message classification indicated in the user-specified input. For example, the network element may determine, based on a portion of the message, that the message is a purchase order. In another example, the network element may determine that the message pertains to information desired by an application from an RFID network or a sensor network.

In block 208, at least a portion of the message is processed via the performance, relative to at least the portion of the message, of the actions that are associated with the particular message classification. For example, in response to determining that the message belongs to the "purchase order" message classification, the network element may perform one or more specified actions that are associated with the "purchase order" message classification. The specified actions may include, for example, modifying the message's format (e.g., from XML to EDI) and sending the message toward a server application using a different application layer protocol (e.g., FTP) than the protocol that a client application used to send the message. Examples of other possible actions are described below.

Figure 2B:
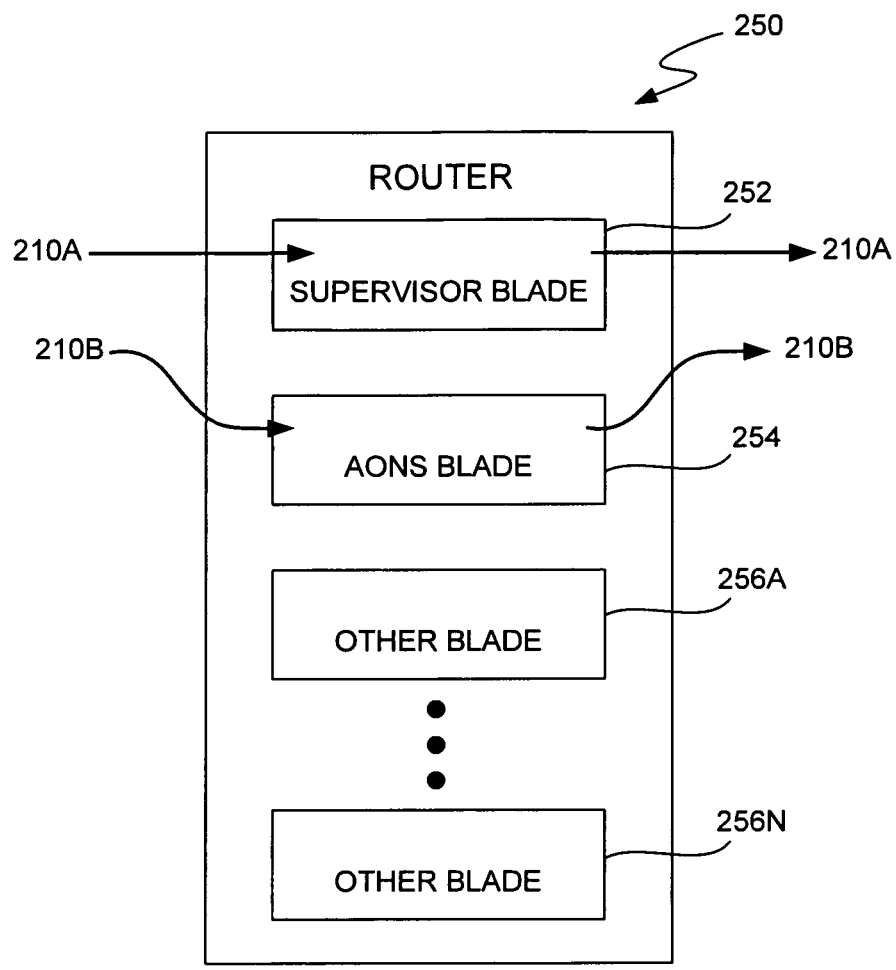
FIG. 2B is a block diagram that illustrates one embodiment of a network device that can be configured to perform some methods of the present invention.

According to one embodiment, an AON blade in a router or a switch performs at least some of the actions discussed above. FIG. 2B is a block diagram that illustrates one embodiment of a router 250 in which a supervisor blade 252 directs some of packet flows 210A-B to an AON blade and/or other blades 256N. Router 250 comprises supervisor blade 252, AONS blade 254, and other blades 256A-N. Each of blades 252, 254, and 256A-N is a single circuit board populated with components such as processors, memory, and network connections that are usually found on multiple boards. Blades 252, 254, and 256A-N are designed to be addable to and removable from router 250. The functionality of router 250 is determined by the functionality of the blades therein. Adding blades to router 250 can augment the functionality of router 250, but router 250 can provide a lesser degree of functionality with fewer blades at a lesser cost if desired. One or more of the blades may be optional.

Router 250 receives packet flows such as packet flows 210A-B. More specifically, in one embodiment, packet flows 210A-B received by router 250 are received by supervisor blade 252. Supervisor blade 252 may comprise a forwarding engine and/or a route processor such as those commercially available from Cisco Systems, Inc. In an alternative embodiment, router 250 comprises one or more network I/O modules that may comprise a forwarding engine; in such an alternative embodiment, the operations described below as being performed by supervisor blade 252 are performed instead by a forwarding engine that is not situated within supervisor blade 252, so that packets may be forwarded to AONS blade 254 without ever going through supervisor blade 252.

In one embodiment, supervisor blade 252 classifies packet flows 210A-B based on one or more parameters contained in the packet headers of those packet flows. If the parameters contained in the packet header of a particular packet match specified parameters, then supervisor blade 252 sends the packets to a specified one of AONS blade 254 and/or other blades 256A-N. Alternatively, if the parameters contained in the packet header do not match any specified parameters, then supervisor blade 252 performs routing functions relative to the particular packet and forwards the particular packet on toward the particular packet's destination.

For example, supervisor blade 252 may determine that packet headers in packet flow 210B match specified parameters. Consequently, supervisor blade 252 may send packets in packet flow 210B to AONS blade 254. Supervisor blade 252 may receive packets back from AONS blade 254 and/or other blades 256A-N and send the packets on to the next hop in a network path that leads to those packets' destination. For another example, supervisor blade 252 may determine that packet headers in packet flow 210A do not match any specified parameters. Consequently, without sending any packets in packet flow 210A to AONS blade 254 or other blades 256A-N, supervisor blade 252 may send packets in packet flow 210A on to the next hop in a network path that leads to those packets' destination.

AONS blade 254 and other blades 256A-N receive packets from supervisor blade 252, perform operations relative to the packets, and return the packets to supervisor blade 252. Supervisor blade 252 may send packets to and receive packets from multiple blades before sending those packets out of router 250. For example, supervisor blade 252 may send a particular group of packets to other blade 256A. Other blade 256A may perform firewall functions relative to the packets and send the packets back to supervisor blade 252. Supervisor blade 252 may receive the packet from other blade 256A and send the packets to AONS blade 254. AONS blade 254 may perform one or more message payload-based operations relative to the packets and send the packets back to supervisor blade 252.

According to one embodiment, the following events occur at an AON router such as router 250. First, packets, containing messages from clients to servers, are received. Next, access control list-based filtering is performed on the packets and some of the packets are sent to an AON blade or module. Next, TCP termination is performed on the packets. Next, Secure Sockets Layer (SSL) termination is performed on the packets if necessary. Next, Universal Resource Locator (URL)-based filtering is performed on the packets. Next, message header-based and message content-based filtering is performed on the packets. Next, the messages contained in the packets are classified into AON message types. Next, a policy flow that corresponds to the AON message type is selected. Next, the selected policy flow is executed. Then the packets are either forwarded, redirected, dropped, copied, modified, or fanned-out as specified by the selected policy flow. As with other flows illustrated herein, the foregoing steps are not necessarily performed in the order indicated.

Figure 3A:
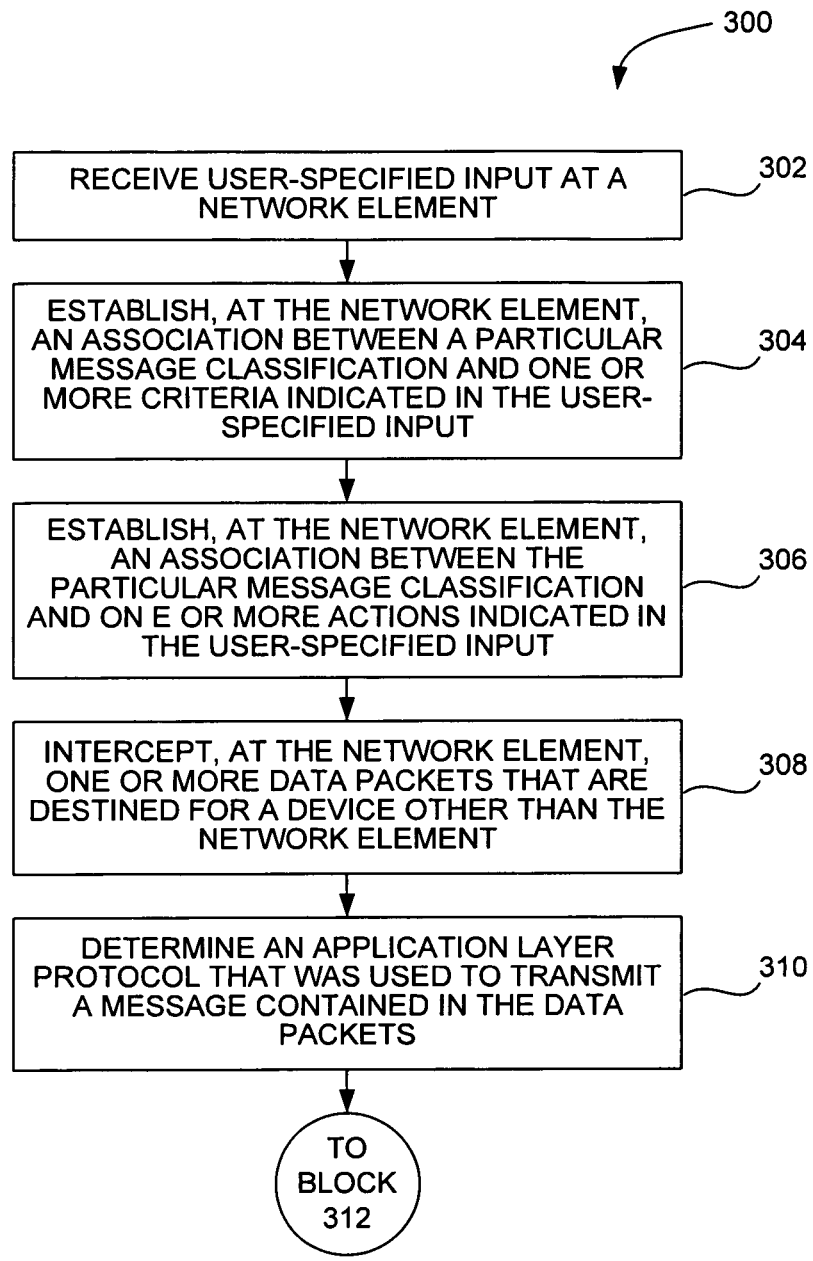
FIGS. 3A and 3B illustrate a flow chart that outlines another method that can be used to implement the present invention.
Figure 3B:
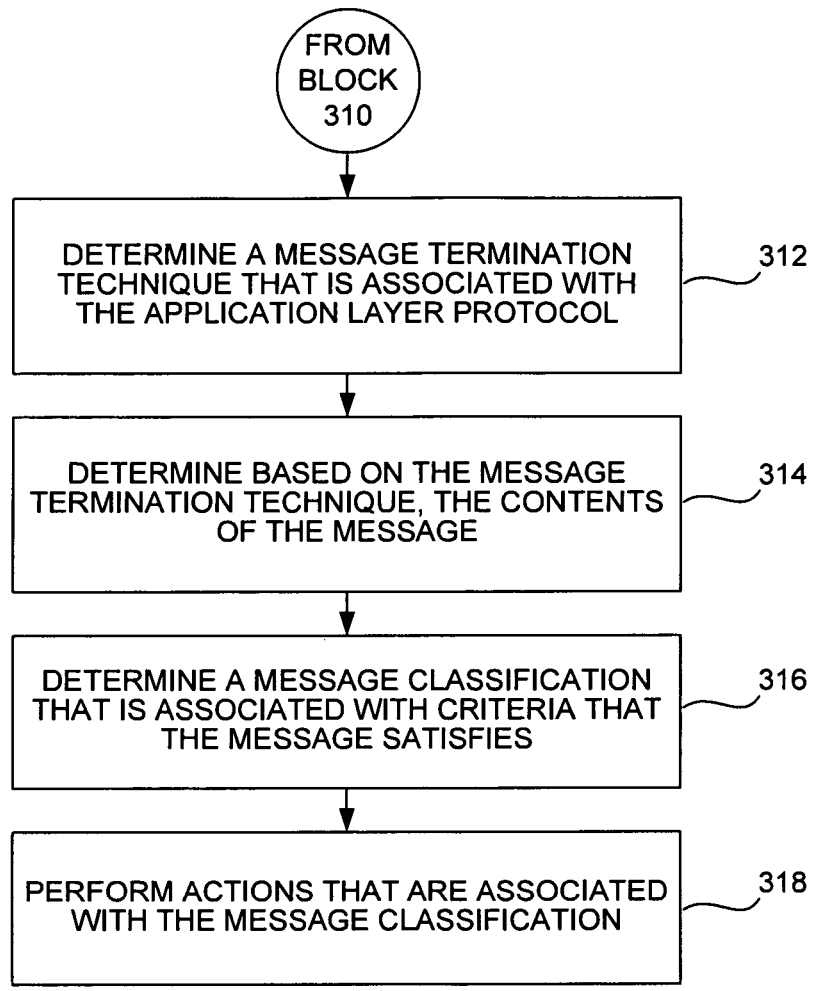

FIGS. 3A and 3B depict a flow diagram 300 that illustrates one embodiment of a method of performing message payload processing functions at a network element on behalf of an application. For example, AONS blade 254 may perform one or more steps of such a method. Other embodiments may omit one or more of the operations depicted in flow diagram 300. Other embodiments may contain operations additional to the operation depicted in flow diagram 300. Other embodiments may perform the operations depicted in flow diagram 300 in an order that differs from the order depicted in flow diagram 300.

Referring first to FIG. 3A, in block 302, user-specified input is received at a network element. The user-specified input indicates the following: one or more criteria that are to be associated with a particular message classification, and one or more actions that are to be associated with the particular message classification. The user-specified input may indicate an order in which the one or more actions are to be performed. The user-specified input may indicate that outputs of actions are to be supplied as inputs to other actions. For example, AONS blade 254 may receive such user-specified input from a network administrator.

The user-specified input may indicate multiple sets of criteria that are to be associated, respectively, with multiple separate message classifications, and multiple sets of actions that are to be associated with the multiple message classifications. For example, the user-specified input may indicate a first set of criteria that is to be associated with a first message classification, a second set of criteria that is to be associated with a second message classification, a first set of actions that are to be associated with the first message classification, and a second set of actions that are to be associated with the second message classification.

In block 304, an association is established, at the network element, between the particular message classification and the one or more criteria. For example, AONS blade 254 may establish an association between a particular message classification and one or more criteria. For example, the criteria may indicate a particular string of text that a message needs to contain in order for the message to belong to the associated message classification. For another example, the criteria may indicate a particular path that needs to exist in the hierarchical structure of an XML-formatted message (or based in an XPath Boolean expression) in order for the message to belong to the associated message classification. For another example, the criteria may indicate one or more source IP addresses and/or destination IP addresses from or to which a message needs to be addressed in order for the message to belong to the associated message classification.

Multiple associations may be established between separate sets of criteria and separate message classifications. For example, AONS blade 254 may establish a first association between a first set of criteria and a first message classification, and a second association between a second set of criteria and a second message classification.

In block 306, an association is established, at the network element, between the particular message classification and the one or more actions. One or more actions that are associated with a particular message classification comprise a "policy" that is associated with that particular message classification. A policy may comprise a "flow" of one or more actions that are ordered according to a particular order specified in the user-specified input, and/or one or more other actions that are not ordered. For example, AONS blade 254 may establish an association between a particular message classification and one or more actions. Collectively, the operations of blocks 302-306 comprise "provisioning" the network element.

Multiple associations may be established between separate sets of actions and separate message classifications. For example, AONS blade 254 may establish a first association between a first set of actions and a first message classification, and a second association between a second set of actions and a second message classification.

In block 308, one or more data packets that are destined for a device other than the network element are received by the network element. The data packets may be, for example, data packets that contain IP and TCP headers. The IP addresses indicated in the IP headers of the data packets may differ from the network element's IP address; thus, the data packets may be destined for a device other than the network element. For example, supervisor blade 252 may intercept data packets that a client application originally sent. The data packets might be destined for a server application, for example.

In block 310, based on one or more information items indicated in the headers of the data packets, an application layer protocol that was used to transmit a message contained in the payload portions of the data packets (hereinafter "the message") is determined. The information items may include, for example, a source IP address in an IP header, a destination IP address in an IP header, a TCP source port in a TCP header, and a TCP destination port in a TCP header. For example, a network element, and more specifically AONS blade 254, may store mapping information that maps FTP (an application layer protocol) to a first combination of IP addresses and/or TCP ports, and that maps HTTP (another application layer protocol) to a second combination of IP addresses and/or TCP ports. Based on this mapping information and the IP addresses and/or TCP ports indicated by the data packets, network element may determine which application layer protocol (FTP, HTTP, Simple Mail Transfer Protocol (SMTP), etc.) was used to transmit the message.

In block 312, a message termination technique that is associated with the application layer protocol used to transmit the message is determined. For example, AONS blade 254 may store mapping information that maps FTP to a first procedure, that maps HTTP to a second procedure, and that maps SMTP to a third procedure. The first procedure may employ a first message termination technique that can be used to extract, from the data packets, a message that was transmitted using FTP. The second procedure may employ a second message termination technique that can be used to extract, from the data packets, a message that was transmitted using HTTP. The third procedure may employ a third message termination technique that can be used to extract, from the data packets, a message that was transmitted using SMTP. Based on this mapping information and the application layer protocol used to transmit the message, a network element may determine which procedure should be called to extract the message from the data packets.

In block 314, the contents of the message are determined based on the termination technique that is associated with the application layer protocol that was used to transmit the message. For example, AONS blade 254 may provide the data packets as input to a procedure that is mapped to the application layer protocol determined in block 312. The procedure may use the appropriate message termination technique to extract the contents of the message from the data packets. The procedure may return the message as output to AONS blade 254. Thus, in one embodiment, the message extracted from the data packets is independent of the application layer protocol that was used to transmit the message.

In one embodiment, determining the contents of the message involves assembling the contents of the payload portions of two or more of the data packets. For example, a network element may determine the proper order of two or more TCP data packets (based on TCP sequence numbers, for example), extract the contents of the payload portions of the TCP data packets, and concatenate the contents according to the proper order to form at least a portion of the message. The message may be a multi-part (MIME) message, and each part may be handled separately as though it were a separate message; each part may be associated with a different message classification.

In block 316, a message classification that is associated with criteria that the message satisfies is determined. For example, a network element may store mapping information that maps different criteria to different message classifications. The mapping information indicates, among possibly many different associations, the association established in block 304. The network element may determine whether the contents of the message satisfy criteria associated with any of the known message classifications. In one embodiment, if the contents of the message satisfy the criteria associated with a particular message classification, then it is determined that the message belongs to the particular message classification.

Although, in one embodiment, the contents of the message are used to determine a message's classification, in alternative embodiments, information beyond that contained in the message may be used to determine the message's classification. For example, in one embodiment, a combination of the contents of the message and one or more IP addresses and/or TCP ports indicated in the data packets that contain the message is used to determine the message's classification. For another example, in one embodiment, one or more IP addresses and/or TCP ports indicated in the data packets that contain the message are used to determine the message's classification, regardless of the contents of the message.

In block 318, one or more actions that are associated with the message classification determined in block 316 are performed. If two or more of the actions are associated with a specified order of performance, as indicated by the user-specified input, then those actions are performed in the specified order. If the output of any of the actions is supposed to be provided as input to any of the actions, as indicated by the user-specified input, then the output of the specified action is provided as input to the other specified action.

A variety of different actions may be performed relative to the message. For example, an action might indicate that the message is to be dropped. In this case, the message is prevented from being forwarded out of the network element toward that message's destination. For another example, an action might indicate that a message is to be compressed using a specified compression technique before being forwarded out of the network element.

For another example, an action might indicate that the content of the message is to be altered in a specified manner. For example, an action might indicate that specified text is to be inserted into a specified location in the message. A path in an XML hierarchical structure of the message might specify such a location, for example, or a specified string of text occurring in the message might specify such a location. For another example, an action might indicate that specified text is to be deleted from the message. For another example, an action might indicate that specified text is to be substituted for other specified text in the message. Text inserted into the message might be obtained dynamically ("on the fly") from a database that is external to the network element.

For another example, an action might indicate that the message format of a message is to be altered in a specified manner. For example, an action might indicate that a message's format is to be changed from XML to some other format such as EDI. For another example, an action might indicate that a message's format is to be changed from some format other than XML into XML. The message format may be altered without altering the core content of the message, which is independent of the message format.

For another example, an action might indicate that the message is to be forwarded using a specified application layer protocol other than the application layer protocol that the message's origin used to transmit the message. For example, a client application might have used a first application layer protocol, such as HTTP, to transmit the message. Thus, when intercepted by supervisor blade 252, the message might have contained an HTTP header. However, in accordance with a specified action, before the network element forwards the message towards the message's destination, the network element, and more specifically AONS blade 254, may modify the message so that the message will be carried using an application layer protocol other than HTTP (such as FTP, SMTP, etc.).

For another example, an action might indicate that the message's destination is to be altered so that the message will be forwarded towards a device that is different from the device that the message's source originally specified. For example, in accordance with a specified action, a network element, and more specifically AONS blade 254, might encapsulate the message in one or more new IP data packets that indicate a new destination IP address that differs from the destination IP address that originally intercepted IP data packets indicated. The network element may then forward the new IP data packets toward the new destination. In this manner, message content-based routing may be achieved.

For another example, an action might indicate that a specified event is to be written into a specified log that might be external to the network element. For example, in accordance with a specified action, AONS blade 254 might write at least a portion of the message, along with the IP address from which the message was received, to a log file.

For another example, an action might indicate that the message is to be encrypted using a specified key before being forwarded to a destination. For example, in accordance with a specified action, AONS blade 254 might encrypt at least a portion of the message using a specified key and then forward data packets that contain the encrypted message towards the message's destination. Encryption also places a constraint on the subsequent action (e.g., a constraint that the encrypted portion cannot be modified).

For another example, an action might indicate that a response cached at the network element is to be returned to the device from which the message originated, if such a response is cached at the network element. For example, a network element may determine whether a response to the message is cached at the network element; such a response might have be cached at the network element at the time a previous response to the same message passed through the network element. If the network element determines that such a response is cached, then the network element may return the response to the message's origin. For read-only operations without any persistent state change, the network element does not need to forward the message to the message's destination and the message's destination does not need to issue another response to the message.

For another example, an action might indicate that some authentication information in the message, such as a user identifier and associated password, is to be used to authenticate the message. For example, AONS blade 254 might authenticate a message by comparing authentication information in the message with trusted information stored by router 250.

If the message was modified in some way (e.g., content, format, or protocol modification) during the performance of the actions, and if the modified message is supposed to be forwarded out of the network element, then the network element encapsulates the modified message into new data packets and sends the new data packets towards the modified message's destination—which also might have been modified.

A message might not belong to any known message classification. In this case, according to one embodiment, the network element does not perform any user-specified actions relative to the message. Instead, the network element simply forwards the data packets to the next hop along the path to the data packets' indicated destination.

The method illustrated in flow diagram 300 may be performed relative to multiple sets of data packets, each set carrying a separate message. For example, a network element may perform the method illustrated relative to a first set of data packets that carry a first message, and then may perform the method relative to a second set of data packets that carry a second message. The first message might satisfy a first set of criteria associated with a first message classification, and the second message might satisfy a second set of criteria associated with a second message classification. Thus, a network element might perform a first set of actions relative to the first message and a second set of actions relative to the second message.

As a result of the method illustrated in flow diagram 300, applications can communicate with each other as though no network elements acted as intermediaries as though each other application communicated using the same message format and application layer protocol.

Figure 4:
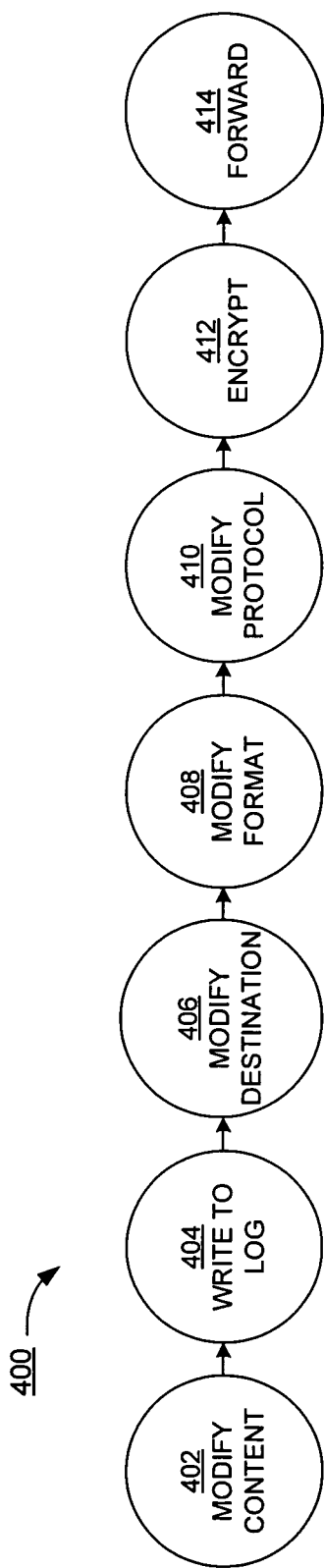
FIG. 4 is a flow chart that outlines still another method that can be used to implement the present invention.

FIG. 4 depicts a sample flow 400 that might be associated with a particular message classification. Flow 400 comprises, in order, actions 402-414; other flows may comprise one or more other actions. Action 402 indicates that the content of the message should be modified in a specified manner. Action 404 indicates that a specified event should be written to a specified log. Action 406 indicates that the message's destination should be changed to a specified destination. Action 408 indicates that the message's format should be translated into a specified message format. Action 410 indicates that the application layer protocol used to transmit the message or content should be changed to a specified application layer protocol. Action 412 indicates that the message or content should be encrypted using a particular key. Action 414 indicates that the message should be forwarded towards the message's destination. Other actions might include signing and verification actions, for example.

In other embodiments, any one of actions 402-414 may be performed individually or in combination with any others of actions 402-414.

Typically, inspecting, parsing, and modifying an application layer message is a processing resource-intensive operation that cannot be performed as quickly as routing operations that are based only on information in TCP and IP packet headers. Referring again to FIG. 2B, using packet level processing rather than message level processing, supervisor blade 252 might be able to process and send packets to AONS blade 254 faster than AONS blade 254 can process application layer messages contained within those packets. Indeed, there might be some packets that contain application layer messages that AONS blade 254 does not need to process at all. Sending such packets to AONS blade 254 would only waste processing resources and cause packet buffers of AONS blade 254 to become backed up with packets.

Therefore, in one embodiment, supervisor blade 252 sends only some selected packets to AONS blade 254. The technique by which supervisor blade 252 selects these packets may be referred to as "filtering." As a result of filtering, AONS blade 254 does not receive as many packets with which AONS blade 254 is likely to do nothing.

Figure 5:
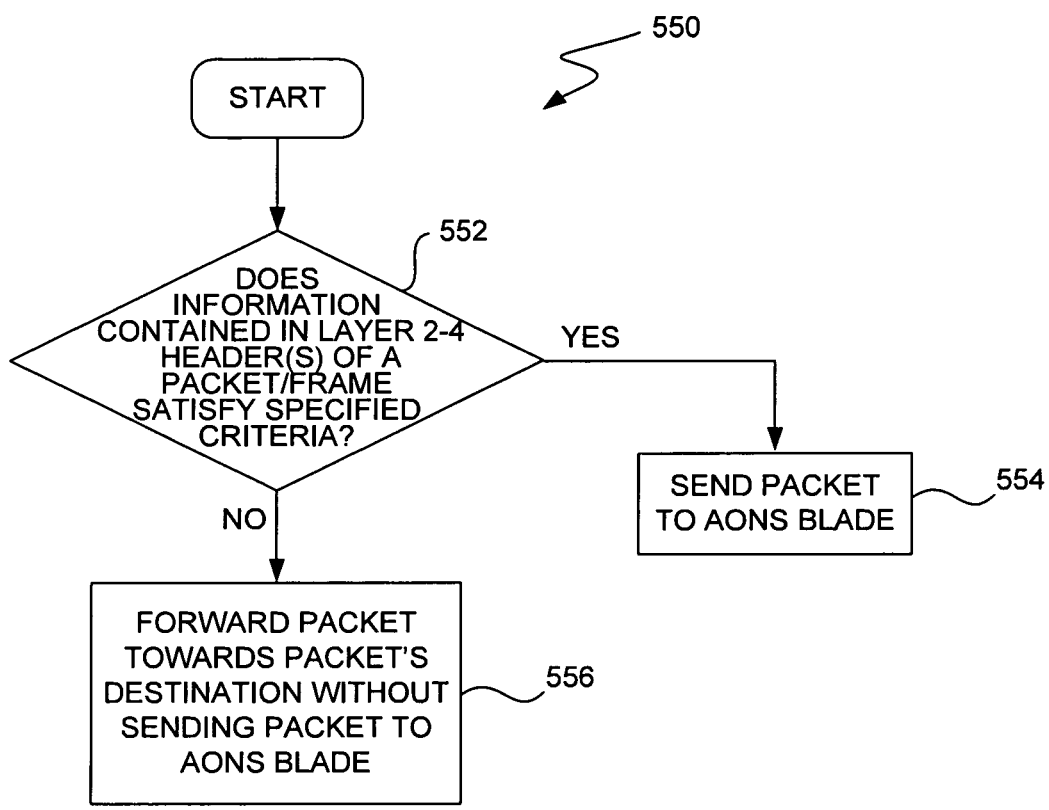
FIG. 5 is a flow chart that outlines a filtering method that can be used to implement the present invention.

FIG. 5 depicts a flow diagram 550 that illustrates one embodiment of a method of filtering packets for which message level processing is to be performed. In block 552, it is determined whether information contained in a layer 2-4 header of a packet or frame satisfies specified criteria. The criteria might specify particular sources and/or particular destinations that packets need to be coming from and/or going to in order to merit message level processing. For example, supervisor blade 252 might determine whether a combination of one or more of a packet's source IP address, source TCP port, destination IP address, and destination TCP port match any user-specified combinations of these addresses and ports. If the header information satisfies the specified criteria, then control passes to block 554. Otherwise, control passes to block 556.

In block 554, the packet is sent to an AONS blade. For example, supervisor blade 252 may direct the packet to AONS blade 254. AONS blade 254 may then perform more resource-intensive message level processing on an application layer message that is at least partially contained in the packet.

Alternatively, in block 556, the packet is forwarded on towards the packet's destination. For example, supervisor blade 252 may route the packet toward the packet's next hop without sending the packet to AONS blade 254. Message level processing is not performed on the packet.

Figure 6:
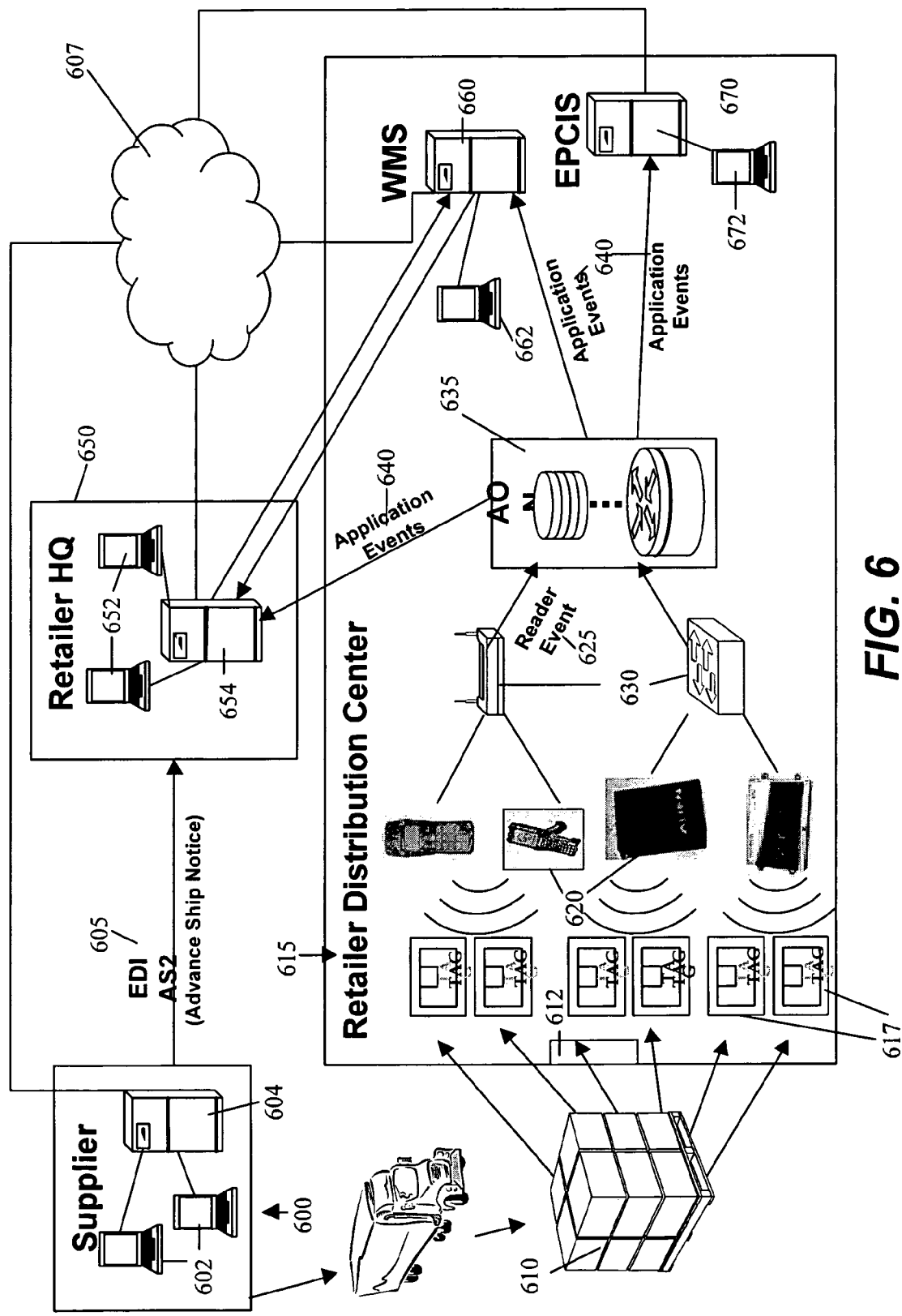
FIG. 6 illustrates an RFID edge server architecture and network traffic flow according to some implementations of the present invention.

FIG. 6 illustrates a simplified portion of an RFID network that depicts one exemplary implementation of the present invention. Here, supplier headquarters 600 includes host devices 602 and network device 604. Supplier headquarters 600 has transmitted an advance shipping notice 605 to retailer headquarters 650. In this example, advance shipping notice 605 was transmitted via network 607 (which is the Internet in this example) via the EDI AS2 standard. Here, retailer headquarters 650 includes host devices 652 and network device 654. These devices may be used, inter alia, to implement enterprise resource planning ("ERP") applications for retailer headquarters 650.

Pallet 610 has been delivered to dock door 612 of retailer distribution center 615. Pallet 610 includes a number of products, each bearing an RFID tag 615. RFID tags 615 have been read by RFID readers 620. Accordingly, reader events 625 have been transmitted via switches 630 to AON-enabled network device 635. Some exemplary embodiments of device 635 will be discussed in more detail below.

Device 635 may perform various important functions as an intermediary between the RFID readers and various applications. For example, device 635 may be configured to provide logical to physical RFID reader location resolution for the applications. In one such example, all of the RFID readers 620 that are positioned near dock door 612 may be virtualized into a single virtual RFID reader. This provides a convenient method for applications to request all reads from dock door 612. Preferred embodiments of device 635 also provide application level event ("ALE") filtering. Such virtualization and filtering may be provided by an ALE adapter provided by a vendor such as ConnecTerra, Inc. Alternatively, such virtualization and filtering may be provided according to novel methods of the invention.

Device 635 may also perform message translation/transformation, security services, application protocol switching and/or other methods according to the present invention. Examples of some such methods are described below.

Accordingly, device 635 transmits application events for use by applications at retailer headquarters 650 and elsewhere. For example, such application events may be used as input for applications running on warehouse management server ("WMS") 660 and/or host 662. Host 662 may be, for example, a monitoring console suitable for monitoring events that take place in retailer distribution center 615. Application events from device 635 may also be used as input for applications running on EPC information services ("EPCIS") server 670 and/or host 672.

Figure 7:
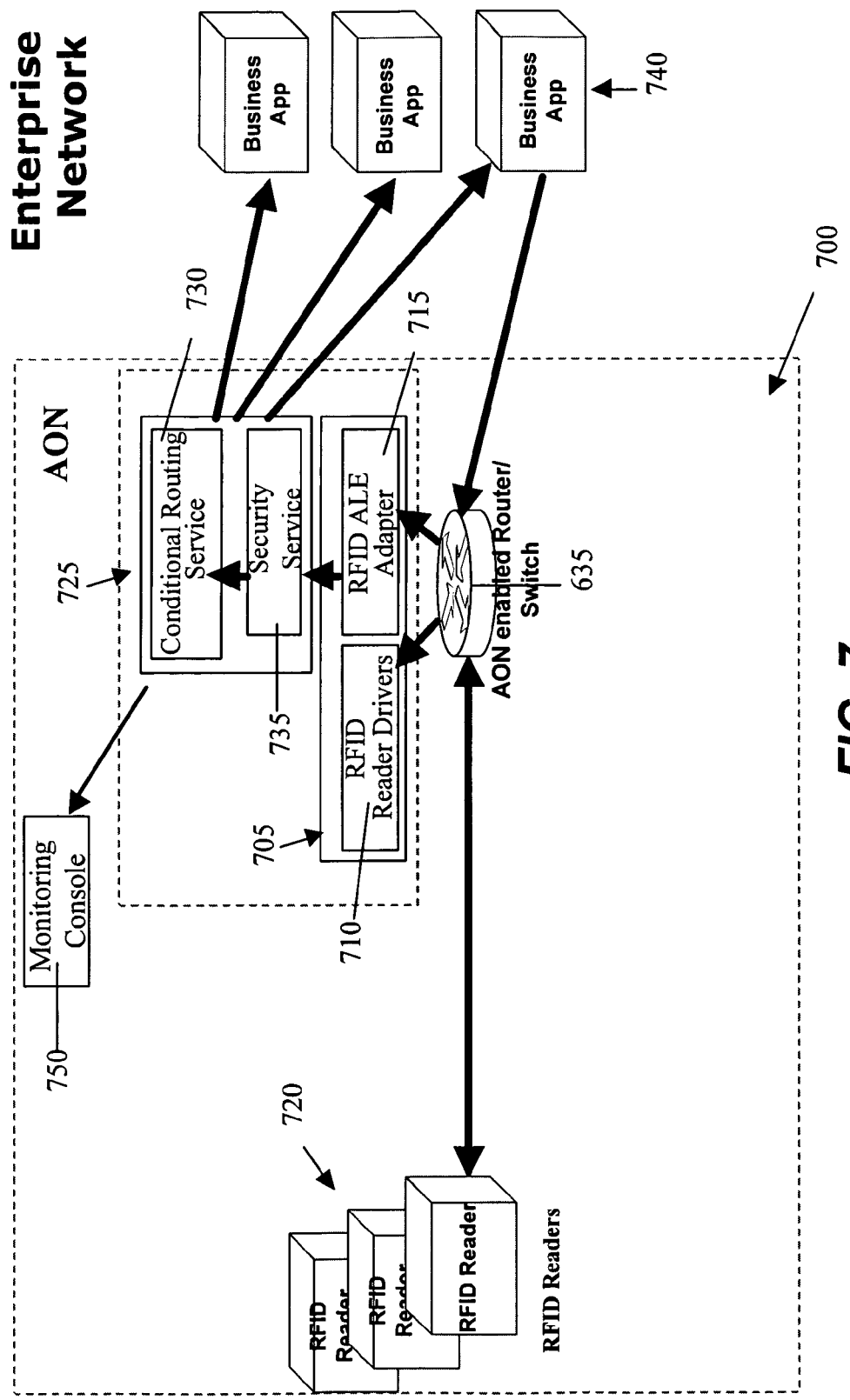
FIG. 7 illustrates some components of a network device configured according to some implementations of the present invention and examples of how these components can communicate with other devices.

FIG. 7 is a block diagram that illustrates tasks performed by modules of device 635 according to one implementation of the invention. In this example, device 635 includes modules 705 and 725, which may be deployed on the same physical component (e.g., the same line card) or on separate physical components. In this embodiment, module 705 includes RFID reader drivers 710 for controlling networked RFID readers 720. For example, RFID reader drivers 710 may control one or more of RFID readers 720 according to RFID event cycle specifications received from business applications 740 running on an enterprise network.

Moreover, module 705 includes ALE adapter 715 for providing various types of ALE functionality. In this example, ALE adapter 715 is configured to perform tasks that include, but are not limited to, filtering of raw RFID reads and RFID reader virtualization. For example, referring again to FIG. 6, suppose device 635 received a request from retailer headquarters 650 to obtain information regarding the products in pallet 610. ALE adapter 715 could virtualize all physical RFID readers 620 at dock door 612, the dock door to which pallet 610 was delivered, into a single virtual RFID reader for the purpose of obtaining all reads from dock door 612, then use RFID reader drivers 710 to control readers 620 accordingly. The raw RFID reads could then be filtered by ALE adapter 715 according to the information desired.

Module 725 includes modules, such as conditional routing service module 730 and security service module 735, to provide an interface between devices running business applications 740, monitoring console 750, etc. In this example, security service module 735 can identify and authenticate the sender of a communication, e.g., from one of the business applications 740. In some implementations, security service module 735 can provide encryption and decryption services.

Conditional routing service module 730 can be configured, for example, to selectively route information to business applications 740 and to monitoring console 750. For example, conditional routing service module 730 may send an alert to monitoring console 750 if certain predetermined conditions are (or are not) occurring. One such condition may be that a valuable item (e.g. a product or a piece of equipment) should not be leaving facility 700. Alternatively, the condition may be that the item should not be leaving in a particular manner, e.g., that the item should not be moved through a particular exit, through an open window, etc. Conditional routing service module 730 can also route RFID event cycle reports from RFID ALE adapter 715 to business applications 740, e.g., based on content. The content may pertain to a location, a product type, a manufacturer type and/or to other criteria that may be indicated, for example, in a prior message from one of business applications 740. For example, the prior message may have included a request for all RFID reads of items on a particular shelf. Alternatively, or additionally, the prior message may have requested of all products in a particular area that were made by a particular manufacturer and/or are a particular product type, as indicated on the RFID tag of the product. For example, the message may have requested information only regarding dishwashing detergent made by Proctor & Gamble.

In this example, module 725 provides other functions such as the parsing and translating of messages from the devices running business applications 740. In some preferred implementations of the invention, module 725 is also configured to communicate with business applications 740 according to a first application protocol and to communicate with ALE adapter 715 according to a second protocol. For example, messages from business applications 740 may be provided according to the first application protocol and responsive communications with ALE adapter 715 may be formed according to a second application protocol. The RFID devices may provide raw reads to ALE adapter 715 according to a third protocol. Although some such methods may be performed generally as described above (e.g., with reference to AONS blade 254), more specific examples are provided below.

Figure 8:
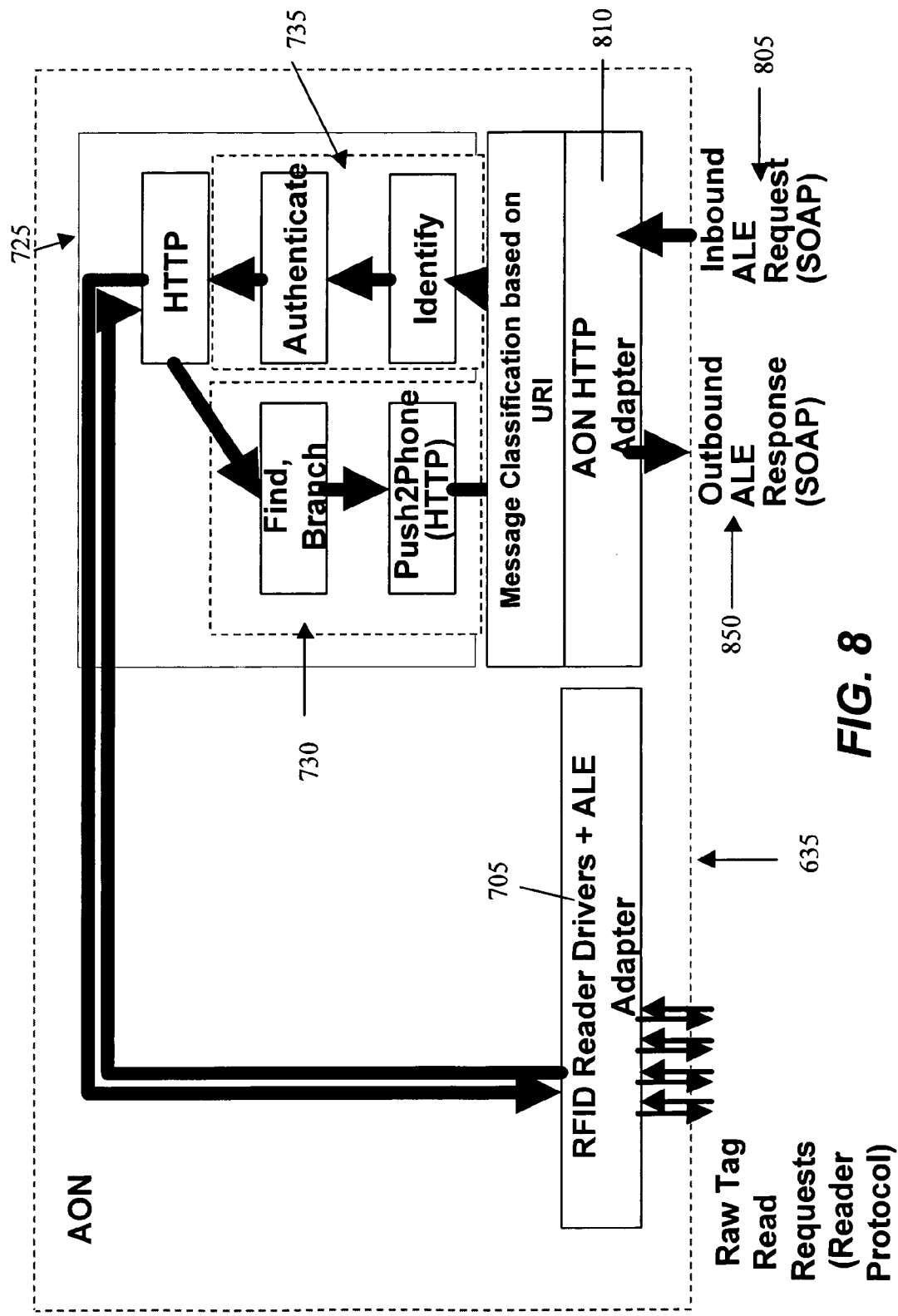
FIG. 8 illustrates an internal message flow for ALE Request/Response messages in a network device configured according to some implementations of the present invention.

FIG. 8 is a block diagram that indicates the flow of an exemplary ALE request/response according to some implementations of the invention. Here, inbound ALE request 805 is received by module 725 from a business application according to a first application protocol, which is the Simple Object Access Protocol ("SOAP") in this example. Module 725 terminates request 805 according to the SOAP protocol and classifies request 805, in this example based on the uniform resource identifier. Here, request 805 seeks to determine how much Quaker State™ WD-40 motor oil is currently in stock at a particular store. Module 725 applies a rule to launch a flow that will obtain an appropriate response to request 805.

In this example, no encryption or decryption is used. However, security service module 735 authenticates request 805 and identifies the sender of request 805.

Here, module 725 also includes HTTP Adapter 810, which is configured to make an HTTP call to the ALE adapter of module 705 according to request 805. Module 705 makes read requests to the appropriate RFID readers in the vicinity of the shelves of the store where containers of Quaker State™ WD-40 motor oil are stored. The ALE adapter of module 705 aggregates and filters the responsive raw RFID reads received from the RFID readers. The ALE adapter then sends an ALE response, which is once again according to the HTTP protocol, to module 725.

Conditional routing service module 730 then determines how to route the ALE response, according to information contained in the response. For example, if conditional routing service module 730 determines that a predetermined pattern or condition exists (e.g., that there are more than a certain number of containers of Quaker State™ WD-40 motor oil missing but not paid for), conditional routing service module 730 may send an alert via an IP phone. An HTTP bladelet may be used for this purpose. Outbound ALE response 850 will be sent to the requesting device according to the protocol of the request, which is the SOAP protocol in this instance.

These steps (as with other flows depicted herein) are not necessarily performed in the sequence indicated in FIG. 8.

For example, the identification and authentication steps may be performed before any other actions are taken.

Figure 9:
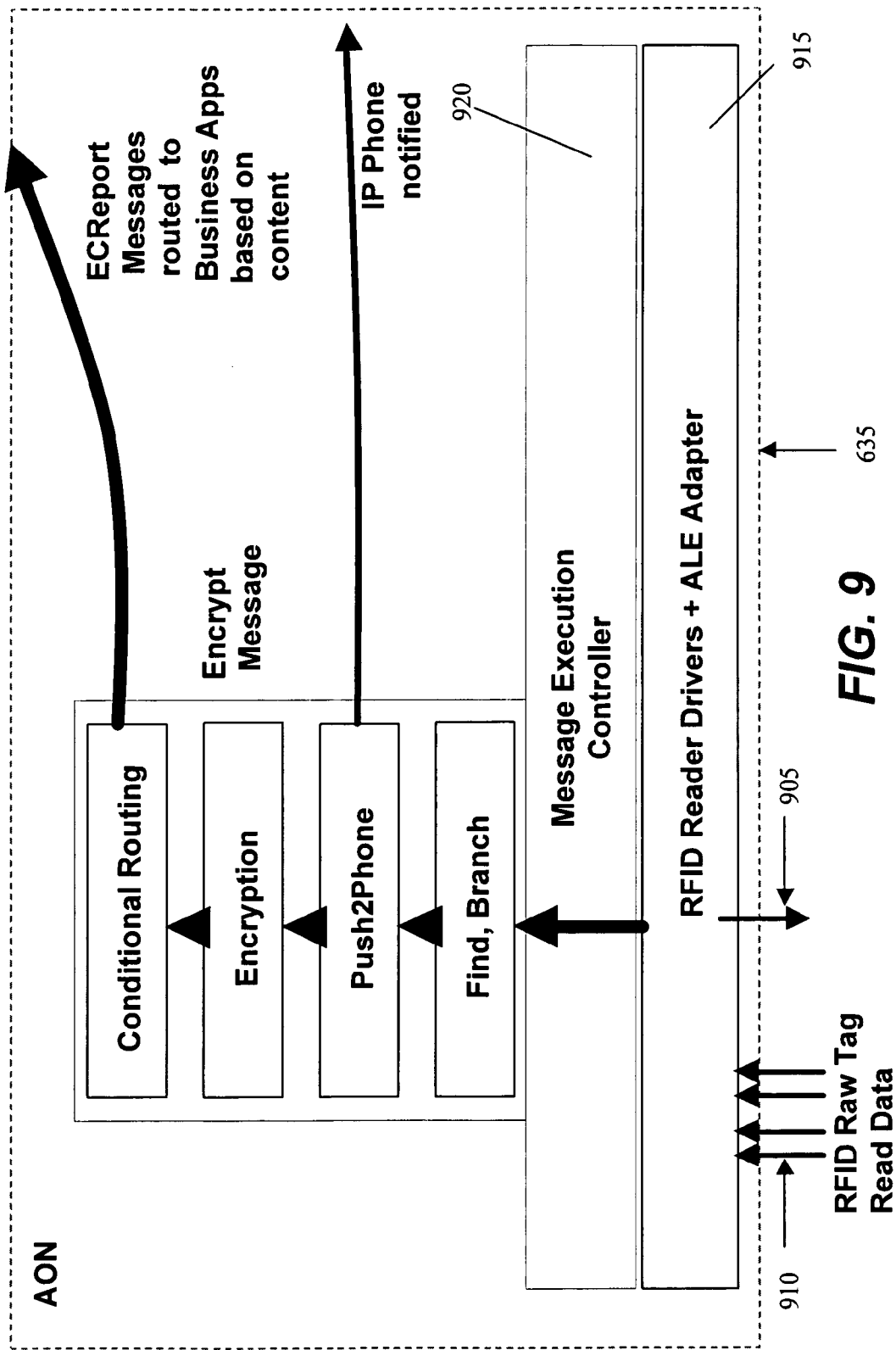
FIG. 9 illustrates an internal message flow for ALE notification messages in a network device configured according to some implementations of the present invention.

FIG. 9 illustrates a flow for processing ALE notification messages according to alternative methods of the invention. The flow illustrated in FIG. 9 may be initiated, for example, according to a standing request. The request could be from a network manager, from a business application, etc. For example, the request could be for RFID reads to occur in a specified area on a periodic basis, e.g., every 5 minutes, once per day, etc. Read request 905 has been sent according to one such procedure, utilizing RFID reader drivers of device 635.

Responsive RFID tag reads are received, aggregated and filtered by ALE adapter 915. In this example, message execution controller 920 finds a pattern that indicates a reporting condition. Accordingly, an alert is sent to an IP phone using an HTTP bladelet. In this example, device 635 also encrypts a reporting message and sends the reporting message to an application. Here, the application is running on a device in an enterprise network at another location.

Figure 10:
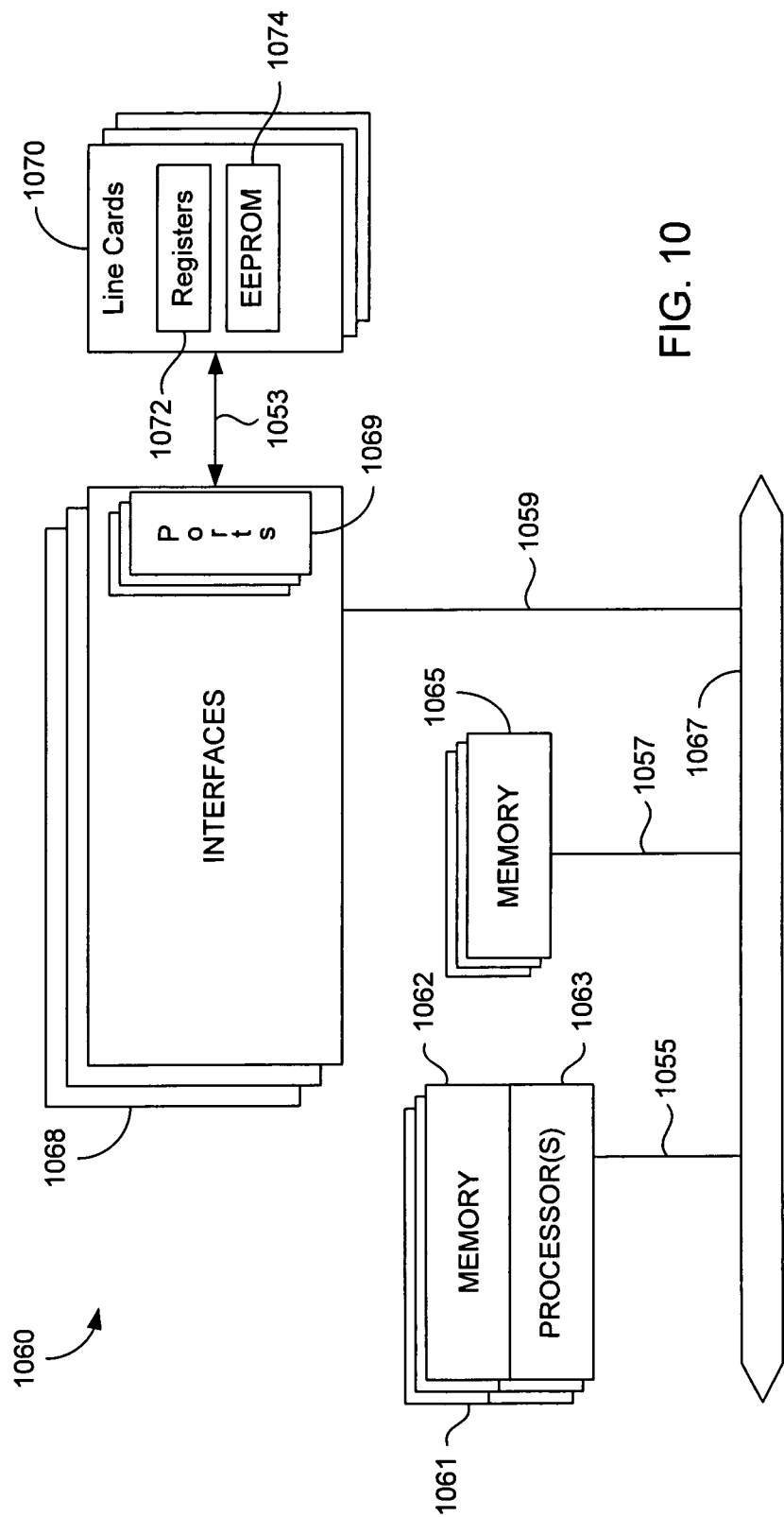
FIG. 10 illustrates another example of a network device that may be configured to implement some methods of the present invention.

FIG. 10 illustrates one example of a network device that may be configured to implement some methods of the present invention. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor 1074 and, in some instances, volatile RAM. Independent processors 1074 may be, for example ASICs or any other appropriate processors. According to some such embodiments, these independent processors 1074 perform at least some of the functions of the logic described herein. In some embodiments, one or more of interfaces 1068 control such communications-intensive tasks as media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "line cards"). Generally, interfaces 1068 control the sending and receiving of data packets over the network and sometimes support other peripherals used with the network device 1060. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system (e.g. Linux, VxWorks, etc.), and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 10 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 10) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method, comprising:

receiving by a network device two or more data packets relating to an RFID device network or a sensor network;

ascertaining by the network device an application layer protocol for a message contained in the two or more data packets;

determining by the network device contents of the message according to the application layer protocol using a procedure that corresponds to the application layer protocol, wherein determining contents of the message includes determining contents of the two or more data packets using the procedure that corresponds to the application layer protocol and assembling the contents of the two or more data packets;

determining a message classification that is associated with criteria satisfied by the message, wherein the message classification is determined based, at least in part, upon the contents of the message including RFID data; and performing by the network device at least one action according to the contents of the message, wherein performing the at least one action includes applying a rule to initiate a predetermined sequence of operations, wherein performing the at least one action according to the contents of the message includes performing one or more actions according to the message classification.

2. The method of claim 1, wherein performing at least one action according to the contents of the message comprises obtaining information from an RFID network.

3. The method of claim 1, wherein performing at least one action comprises making an RFID read request to at least one RFID reader.

4. The method of claim 1, wherein the message comprises input from a sensor network and wherein performing at least one action according to the contents of the message comprises performing at least one action according to the input from the sensor network.

5. The method of claim 1, wherein the message relates to at least one device of a manufacturing network.

6. The method of claim 1, wherein applying a rule to initiate a predetermined sequence of operations comprises performing the predetermined sequence of operations at a predetermined time interval.

7. The method of claim 2, wherein the information pertains to least one of an indicated manufacturer, an indicated location, an indicated product type or an indicated time period.

8. The method of claim 1, further comprising:
identifying a procedure that corresponds to the application layer protocol.

9. The method of claim 1, wherein the message is a multi-part (MIME) message.

10. The method of claim 9, further comprising:
determining a proper order of the two or more data packets;
wherein assembling the contents of the two or more packets comprises assembling contents of payload portions of the two or more packets according to the proper order such that the contents of the message are obtained.

11. The method of claim 1, further comprising:
determining a proper order of the two or more data packets;
wherein assembling the contents of the two or more packets comprises assembling contents of payload portions of the two or more packets according to the proper order such that the contents of the message are obtained.

12. The method of claim 1, wherein the message classification pertains to a purchase order, a product type, or a manufacturer.

13. The method of claim 1, wherein the message classification pertains to RFID reads corresponding to a particular location.

14. An apparatus, comprising:
at least one network interface configured for communication with sensors in a RFID sensor network and with devices executing RFID sensor-related applications;
a processor; and
a memory,
at least one of the processor or the memory configured to do the following:
receive two or more data packets;
ascertain an application layer protocol for a message contained in the two or more data packets;
determine contents of the message according to the application layer protocol using a procedure or technique that corresponds to the application layer protocol, wherein determining contents of the message includes determining contents of the two or more data packets using the procedure that corresponds to the application layer protocol and assembling the contents of the two or more data packets such that the message is obtained;
determine a message classification that is associated with criteria satisfied by the message, wherein the message classification is determined based, at least in part, upon the contents of the message including RFID data; and
perform at least one action according to the contents of the message, wherein performing the at least one action includes applying a rule to initiate a predetermined sequence of operations, wherein performing the at least one action according to the contents of the message includes performing one or more actions according to the message classification.

15. The apparatus of claim 14, wherein the performing comprises providing information to a device executing sensor-related applications according to input from at least one sensor.

16. The apparatus of claim 14, further comprising an application-oriented network ("AON") module that includes the processor.

17. The apparatus of claim 14, wherein at least one of the processor or the memory is further configured to determine a message classification that is associated with criteria satisfied by the message and to perform at least one action according to the message classification.

18. An apparatus, comprising:
means for receiving two or more data packets relating to an RFID device network or a sensor network;
means for ascertaining an application layer protocol for a message contained in the two or more data packets;
means for determining contents of the message according to the application layer protocol using a procedure or technique associated with the application layer protocol, wherein determining contents of the message includes determining contents of each of the two or more data packets using the procedure that corresponds to the application layer protocol and assembling the contents of the two or more data packets such that the message is obtained;
means for determining a message classification that is associated with criteria satisfied by the message, wherein the message classification is determined based, at least in part, upon the contents of the message including RFID data; and
means for performing at least one action according to the contents of the message, wherein performing the at least one action includes applying a rule to initiate a predetermined sequence of operations, wherein performing the at least one action according to the contents of the message includes performing one or more actions according to the message classification.

19. The apparatus of claim 18, further comprising means for determining a message classification that is associated with criteria satisfied by the message, wherein at least one action is performed according to the message classification.

20. The apparatus of claim 18, wherein the means for performing at least one action comprises means for obtaining information from an RFID network.

21. The apparatus of claim 18, wherein the means for performing at least one action comprises means for making an RFID read request to at least one RFID reader.

22. The apparatus of claim 18, wherein the message comprises input from a sensor network and wherein the means for performing at least one action comprises means for performing at least one action according to the input from the sensor network.

23. The apparatus of claim 18, wherein the message relates to at least one device of a manufacturing network.

24. The method of claim 8, wherein identifying a procedure that corresponds to the application layer protocol comprises identifying a procedure that corresponds to the application layer protocol prior to determining the contents of the message according to the application layer protocol.

25. An apparatus, comprising:
a processor; and
a memory,
at least one of the processor or the memory configured to do the following:
receiving a message relating to an RFID device network, the message including two or more packets;
determining an application layer protocol that was used to transmit the message;
determining a message termination technique that is associated with the application layer protocol;
determining contents of the message, based at least in part on the message termination technique by determining contents of each of the two or more packets using the message termination technique;
determining a proper order of the two or more data packets;
assembling contents of payload portions of the two or more packets according to the proper order such that the contents of the message are obtained;
determining a message classification that is associated with criteria satisfied by the message, wherein the message classification pertains to RFID reads corresponding to a particular location; and
performing at least one action according to the contents of the message, wherein performing the at least one action includes applying a rule to initiate a predetermined sequence of operations, wherein performing the at least one action according to the contents of the message includes performing one or more actions according to the message classification.

26. A method, comprising:
receiving by a network device a multi-part (MIME) message including-two or more data packets relating to an RFID device network or a sensor network;
ascertaining by the network device a first application layer protocol for a first portion of the MIME message contained in a first subset of the two or more data packets;
ascertaining by the network device a second application layer protocol for a second portion of the MIME message contained in a second subset of the two or more data packets;
determining by the network device contents of the first portion of the MIME message according to the first application layer protocol using a first procedure that corresponds to the first application layer protocol;
determining by the network device contents of the second portion of the MIME message according to the second application layer protocol using a second procedure that corresponds to the second application layer protocol;
determining a message classification that is associated with criteria satisfied by the MIME message, wherein the message classification is determined based, at least in part, upon the contents of the first and second portions of the MIME message; and
performing by the network device at least one action according to the contents of the first portion of the MIME message and the second portion of the MIME message, wherein performing the at least one action includes applying a rule to initiate a predetermined sequence of operations, wherein performing the at least one action includes performing one or more actions according to the message classification.

* * * * *